US011873996B2

(12) United States Patent
Bardal et al.

(10) Patent No.: US 11,873,996 B2
(45) Date of Patent: Jan. 16, 2024

(54) COOKTOP WITH HINGED GRATES

(71) Applicant: WHIRLPOOL CORPORATION, Benton Harbor, MI (US)

(72) Inventors: Alexandre Machado Bardal, St. Joseph, MI (US); Randall Vernen Crawford, St. Joseph, MI (US); Patrick J. Duffy, St. Joseph, MI (US); Ken E. Johnson, Owasso, OK (US); Michele Harpring Johnson, St. Joseph, MI (US); John Ryan McNally, Northbrook, IL (US); Paul J. Neuman, St. Joseph, MI (US); Gaston A. Leoni, Sodus, MI (US); Leonardo Portilho Soares, Wesley Chapel, FL (US); Sarah Katherine Small, St. Louis, MO (US)

(73) Assignee: Whirlpool Corporation, Benton Harbor, MI (US)

( * ) Notice: Subject to any disclaimer, the term of this patent is extended or adjusted under 35 U.S.C. 154(b) by 57 days.

(21) Appl. No.: 17/512,831

(22) Filed: Oct. 28, 2021

(65) Prior Publication Data

US 2022/0049852 A1 Feb. 17, 2022

Related U.S. Application Data

(63) Continuation of application No. 16/675,677, filed on Nov. 6, 2019, now Pat. No. 11,162,689.

(51) Int. Cl.
*F24C 15/10* (2006.01)
*A47J 37/06* (2006.01)

(52) U.S. Cl.
CPC .......... *F24C 15/107* (2013.01); *A47J 37/067* (2013.01)

(58) Field of Classification Search
CPC .................................................... F24C 15/107
See application file for complete search history.

(56) References Cited

U.S. PATENT DOCUMENTS

| 416,068 A | 11/1889 | Muller |
| 996,322 A | 6/1911 | Edwards |
| 1,263,203 A | 4/1918 | Burnett |
| 1,385,541 A | 7/1921 | Hammer |
| 1,539,276 A | 5/1925 | Savage |
| 2,066,507 A * | 1/1937 | Yost ..................... A47J 37/0611 99/380 |
| 2,200,016 A | 5/1940 | Althoff |
| 2,528,333 A | 10/1950 | Biddle et al. |
| 2,823,657 A | 2/1958 | Brodbeck |

(Continued)

FOREIGN PATENT DOCUMENTS

| DE | 10126935 A1 | 12/2002 |
| EP | 505806 A1 | 9/1992 |

(Continued)

*Primary Examiner* — Avinash A Savani
*Assistant Examiner* — Deepak A Deean
(74) *Attorney, Agent, or Firm* — Price Heneveld LLP

(57) ABSTRACT

A cooking appliance includes a cooktop and a burner mounted on the cooktop. At least one coupling member is coupled to the cooktop. A grate, a griddle, or a reversible griddle is selectively coupled to the at least one coupling member and is operable between a raised position and a lowered position when the grate, the griddle, or the reversible griddle, is engaged with the coupling member.

13 Claims, 18 Drawing Sheets

(56) References Cited

U.S. PATENT DOCUMENTS

| | | |
|---|---|---|
| 3,632,982 A | 1/1972 | Linger et al. |
| 3,797,375 A | 3/1974 | Cerola |
| 4,206,345 A | 6/1980 | Maass et al. |
| 4,390,114 A | 6/1983 | Sviatoslavsky et al. |
| 4,517,955 A | 5/1985 | Ehrlich et al. |
| 4,869,231 A | 9/1989 | Rice et al. |
| 4,930,491 A | 6/1990 | Purello |
| 5,743,173 A | 4/1998 | Hayashi et al. |
| 5,793,021 A | 8/1998 | Walton |
| 6,271,504 B1 | 8/2001 | Barritt |
| 6,371,105 B1 | 4/2002 | Merritt |
| 8,147,015 B2 | 4/2012 | Kim |
| 8,910,622 B2 * | 12/2014 | Mishra ................. F24C 15/107 126/39 J |
| 9,861,230 B2 | 1/2018 | Freymiller et al. |
| 9,903,593 B2 | 2/2018 | Breneman et al. |
| 10,113,748 B2 | 10/2018 | Braden et al. |
| 10,598,389 B2 * | 3/2020 | Cowan ................. F24C 15/107 |
| 2011/0067577 A1 | 3/2011 | Riddle et al. |
| 2011/0114077 A1 * | 5/2011 | Mishra ................. F24C 15/107 126/39 R |
| 2014/0305422 A1 * | 10/2014 | Breneman ............. F24C 15/107 126/214 C |
| 2015/0257592 A1 * | 9/2015 | Garman ............... A47J 37/0611 219/450.1 |
| 2018/0180294 A1 * | 6/2018 | Breneman ............. F24C 15/107 |
| 2018/0245799 A1 * | 8/2018 | Billman ................ F24C 15/107 |
| 2018/0356101 A1 | 12/2018 | Lee et al. |
| 2019/0383497 A1 * | 12/2019 | Cowan ................. F24C 15/107 |

FOREIGN PATENT DOCUMENTS

| | | |
|---|---|---|
| EP | 2501997 B1 | 3/2016 |
| EP | 2341294 B1 | 2/2017 |
| EP | 2792954 B1 | 3/2017 |
| JP | S6078227 A | 5/1985 |
| JP | S6078228 A | 5/1985 |

\* cited by examiner

COOKTOP WITH HINGED GRATES

CROSS-REFERENCE TO RELATED APPLICATION

This application is a continuation of and claims priority to U.S. Patent Application Ser. No. 16/675,677, filed on Nov. 6, 2019, now U.S. Pat. No. 11,162,689, entitled "COOKTOP WITH HINGED GRATES", the entire disclosure of which is hereby incorporated herein by reference.

BACKGROUND OF THE DISCLOSURE

The present disclosure generally relates to a cooktop. More specifically to a cooktop including grates hingedly supported over associated burners.

SUMMARY OF THE DISCLOSURE

According to one aspect of the present disclosure, a cooking appliance includes a cooktop and a burner mounted on the cooktop. A coupling member is coupled to the cooktop. A grate is selectively coupled to the coupling member and operable between a raised position and a lowered position when the grate is engaged with the coupling member.

According to another aspect of the present disclosure, a cooktop assembly includes a cooktop and a burner mounted on the cooktop. A coupling member is coupled to the cooktop and includes a body that has a first pin that extends from a first end of the body in a first direction and a second pin that extends from a second end of the body in the first direction. A grate includes a pivot member that selectively engages the coupling member. The grate is operable between a raised position and a lowered position when the pivot member is engaged with the coupling member.

According to another aspect of the present disclosure, a cooktop assembly includes a cooktop and a coupling member coupled to the cooktop. The coupling member defines a cavity that has an abutting surface. A grate is rotatable between a raised position and a lowered position. The grate includes a pivot member engageable with the coupling member and that extends from a first end of the grate. The first end engages the abutting surface when the grate is in the raised position.

These and other features, advantages, and objects of the present disclosure will be further understood and appreciated by those skilled in the art by reference to the following specification, claims, and appended drawings.

Figure 1:
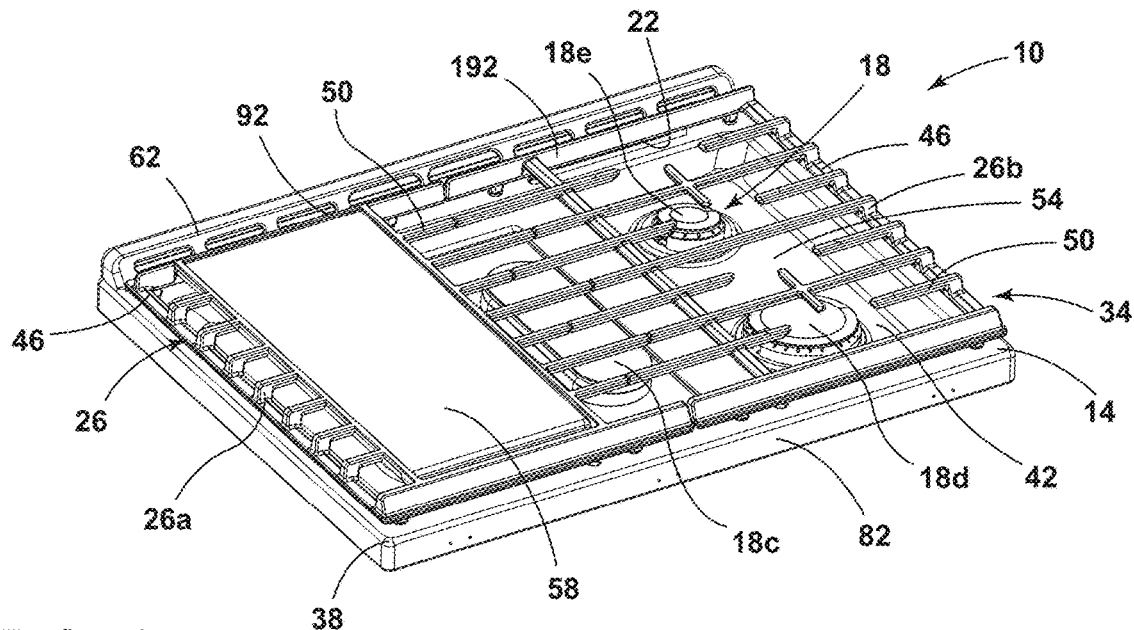
FIG. 1 is a top perspective view of a cooktop with first and second grates in a lowered position, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a cooktop with hinged grates. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-30, reference numeral 10 generally refers to a cooking appliance that has a cooktop 14. A burner 18 is mounted on the cooktop 14. A coupling member 22 is coupled to the cooktop 14. A grate 26 is selectively coupled to the coupling member 22 and operable between a raised position 30 and a lowered position 34 when the grate 26 is engaged with the coupling member 22.

Figure 2:
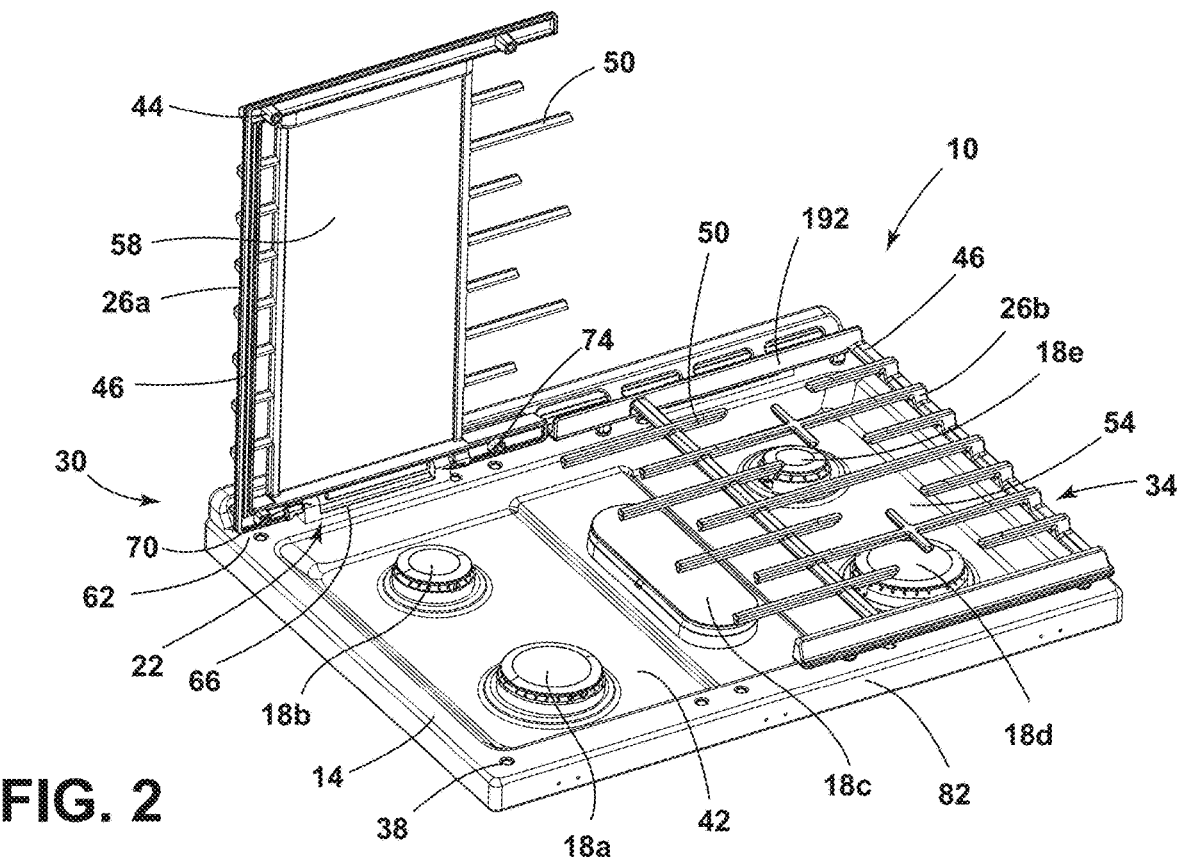
FIG. 2 is a top perspective view of a cooktop with a first grate in a raised position and a second grate in a lowered position, according to the present disclosure.

In various examples, the cooking appliance 10 may be in the form of a range that includes the cooktop 14. The cooktop 14 may be disposed on an oven, both of which may be formed as a single unit. It is also contemplated that the cooking appliance 10 may also be in the form of a standalone cooking hob or a similar configuration. It is further contemplated that the cooktop 14 may be disposed on another appliance and/or a countertop. The cooktop 14 may include the burner 18 which may be one burner 18a of a multi-burner arrangement. As illustrated in FIGS. 1 and 2, the cooktop 14 includes a five-burner arrangement, including burners 18a-18e. As used herein, the various individual burners 18a-18e of the multi-burner arrangement may each be referred to using the general reference numeral 18, unless a specific one of the burners 18a-18e is discussed. The burner 18 may be of any type that may be used in connection with one of the grate 26 positioned over the burner 18 when in the lowered position 34. The grate 26 may support a cooking article, such as a pan, a pot, or the like, above and/or spaced-apart from the burner 18 with which the cooking article is used. In general, the burner 18 may be a fuel-burning burner (e.g., those that rely on the combustion of natural or propane gas for the generation of heat). This may include various types of "hybrid" burners, which may generate heat by multiple means, including fuel-burning and/or electric heating.

The cooktop 14 may be similar to known structures for similar components of the cooking appliance 10 and may be of any structure that can sufficiently support the grate 26. As illustrated in FIG. 1, the cooktop 14 includes a peripheral edge 38 and defines a centrally-located sump 42. The burner 18 may be mounted on the cooktop 14 within the sump 42. In various examples, the coupling member 22 may be disposed proximate the peripheral edge 38 of the cooktop 14. In this way, the grate 26 may be coupled to the coupling member 22 proximate the peripheral edge 38. When in the lowered position 34, the grate 26 may be supported by the cooktop 14 and may be spaced-apart from the surface of the cooktop 14 within the sump 42. As such, when the grate 26 is in the lowered position 34, the grate 26 may be spaced-apart from and disposed above the burner 18. In various examples, the grate 26 may include one or more standing features 44 extending therefrom. The standing features 44 may rest upon the cooktop 14 proximate the peripheral edge 38 to support the grate 26 when the grate 26 is in the lowered position 34. Alternatively, the grate 26 may not include the standing features 44. In such examples, the frame 46 and/or the support members 50 may rest on the cooktop 14.

According to various aspects, the cooktop 14 may be generally structured to provide support and location for the burner 18 and to conceal various lines and controls associated with the burner 18. The cooktop 14 may be a metal sheet stamped, drawn, or otherwise formed, into a desired three-dimensional shape. Such metal may be steel, stainless steel, aluminum, and/or other similar materials, and may be of a gauge high enough to provide structural stability without unnecessarily increasing weight or difficulty of the manufacture thereof.

With further reference to FIGS. 1-30, various configurations of the grate 26 and the coupling members 22 are illustrated. Each of the different configurations may be used interchangeably, such that the configurations and arrangements of the cooktop 14 are non-limiting. It will be understood that other possible configurations may also be used outside those set forth in FIGS. 1-30. It will also be understood that like reference numerals will be used for like features in each of the figures.

Referring to FIGS. 1 and 2, in various examples, the grate 26 may include a first grate 26a and a second grate 26b. As used herein, the first and second grates 26a, 26b may each be referred to using the general reference number 26, unless a specific one of the grates 26a, 26b is referenced. The first and second grates 26a, 26b may be independently operable between the raised and lowered positions 30, 34. As illustrated in FIGS. 1 and 2, the first grate 26a may alternately cover and uncover the burners 18a, 18b and partially cover and uncover the burner 18c. Additionally or alternatively, the second grate 26b may alternately cover and uncover the burners 18d, 18e, and may partially cover and uncover the burner 18c. The first and second grates 26a, 26b may be configured to appear as a single continuous grate 26, such that any center "seam" is visually obscured to the user when both the first and second grates 26a, 26b are in the lowered position 34.

The grate 26 may be selectively couplable the coupling member 22, such that the grate 26 may be removed and re-assembled to the cooktop 14 in a same and/or different position relative to the cooktop 14. In examples with the first grate 26a and the second grate 26b, each of the first and second grates 26a, 26b may be coupled to the cooktop 14 by a single coupling member 22, or by multiple coupling members 22. In examples with multiple coupling members 22, the coupling members 22 may have substantially similar, or alternatively, substantially different configurations.

In various examples, the grate 26 may include the frame 46 and the support members 50. The support members 50 may be configured as laterally extending and/or longitudinally extending beams relative to the cooktop 14 that are spaced-apart from one another and define openings 54 therebetween. The cooking article may be supported by the frame 46 and/or the support members 50. According to various aspects, a flame from the burner 18 or its radiant heat with which the cooking article is associated may extend through the openings 54 to heat the cooking article. In additional or alternative configurations, the grate 26 may include a centrally-disposed griddle portion 58. The griddle portion 58 may be configured as a substantially planar, continuous surface heated by burners 18a, 18b, for example, from beneath. The griddle portion 58 may extend between front and rear portions of the grate 26, or alternatively, between lateral side portions of the grate 26. As exemplified by the first grate 26a of FIGS. 1 and 2, the griddle portion 58 may be integrally defined with the grate 26. In various examples, the grate 26 that has the griddle portion 58 may also include the frame 46 and the support members 50. In examples with and without the griddle portion 58, the support members 50 of the grate 26 may be of varying lengths in certain configurations. This may be advantageous for providing a more uniform and/or continuous appearance of the grate 26.

Still referring to FIGS. 1 and 2, the coupling member 22 may be disposed proximate a rear edge 62 of the cooktop 14. In this configuration, the grate 26 may rotate about the coupling member 22, such that a user may rotate the grate 26 upwards and backward relative to the cooktop 14 to rotate the grate 26 to the raised position 30. In this way, the user may rotate the grate 26 down and forward relative to the cooktop 14 to rotate the grate 26 to the lowered position 34. However, it is also contemplated that the coupling member 22 may be disposed elsewhere on the cooktop 14 without departing the teachings herein. According to various aspects, the coupling member 22 may have a variety of configurations depending on the configuration of the grate 26 and/or the location of the coupling member 22 on the cooktop 14. Additionally, other factors may contribute to the configuration of the coupling member 22.

In various examples, the coupling member 22 includes a body 66 and first and second supports 70, 74 extending generally vertically from the body 66. In various examples, the body 66 may be disposed on the cooktop 14 proximate the peripheral edge 38 and may extend between the first and second supports 70, 74. The grate 26 may couple with and may be rotatably supported by the first and second supports 70, 74 to allow grate 26 to rotate between the raised and lowered positions 30, 34. When the grate 26 is in the raised position 30, the coupling member 22 may be visible. This may be advantageous for improving the aesthetics of the cooktop 14. When the grate 26 is in the lowered position 34, the coupling member 22 may be covered by the grate 26 and substantially obscured from view.

Figure 3:
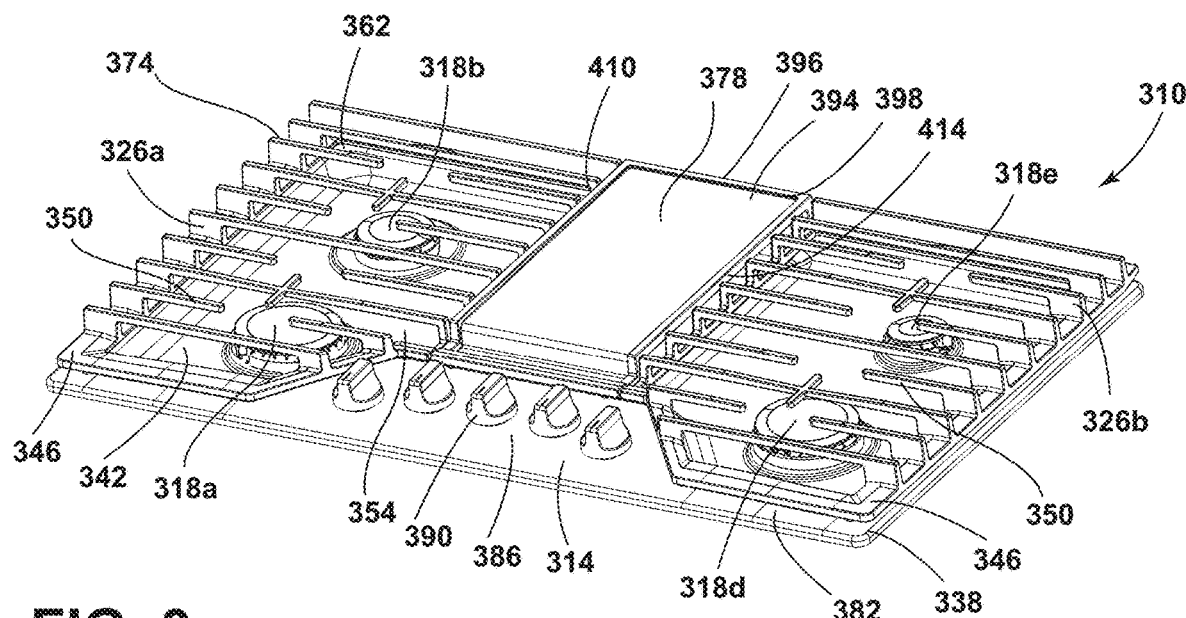
FIG. 3 is a top perspective view of a cooktop that has first and second grates and a griddle, according to the present disclosure.
Figure 4:
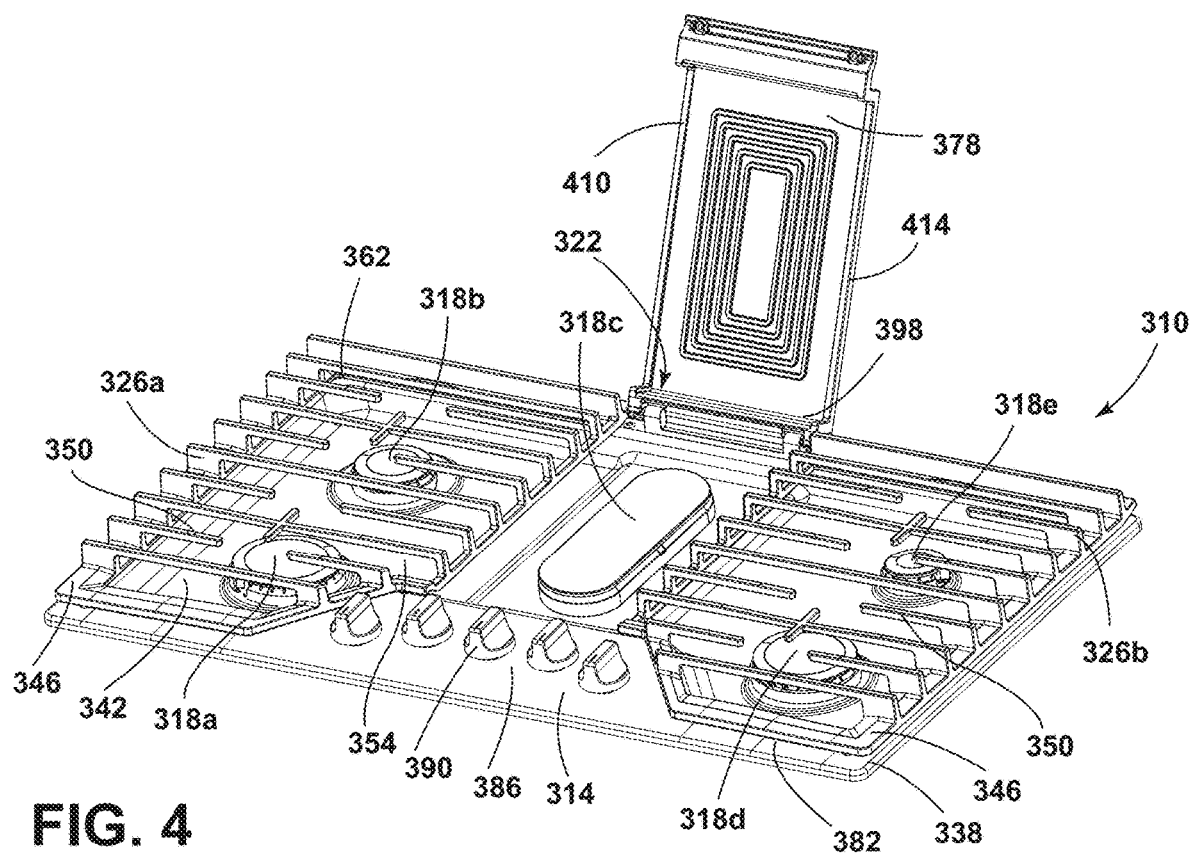
FIG. 4 is a top perspective view of a cooktop with the griddle in a raised position, according to the present disclosure.

Referring now to FIGS. 3 and 4, an additional and/or alternative configuration of the cooktop 14 is illustrated (with similar features indicated by similar numbers increased by 300). A cooktop 314 may include first and second grates 326a, 326b. As illustrated, the first grate 326a may be disposed over front left and rear left burners 318a, 318b when in a lowered position 334. The second grate 326b may be disposed over the front right and rear right burners 318d, 318e when in a lowered position 334. A griddle 378 may be disposed between the first and second grates 326a, 326b. A griddle 378, similar to the grate 326, may be operable between raised and lowered positions 330, 334. In this way, the griddle 378 may be disposed over the central burner 318c when in the lowered position 334. The grate 326 and the griddle 378 may be independently operable between the raised and lowered positions 330, 334 to alternately cover and uncover the burner 318. The grate 326 may extend between a rear edge 362 of the cooktop 314 and a front edge 382 of the cooktop 314. The griddle 378 may also extend between a rear edge 362 and a front edge 382. As illustrated in FIG. 3, the griddle 378 may extend from the rear edge 362 of the cooktop 314 toward the front edge 382, while not extending the entire distance to the front edge 382. In such examples, a control panel 386 having various controls 390 may be disposed proximate the front edge 382 and/or between the front edge 382 and the griddle 378. The controls 390 may be associated with the burner 318 and may be configured to control the burner 318.

Referring still to FIGS. 3 and 4, in various examples, the griddle 378 may include a cooking surface 394. Similar to the griddle portion 58 of FIG. 1, the cooking surface 394 of the griddle 378 may be a substantially planar, continuous surface. The cooking surface 394 may support the cooking article and/or may be configured to cook food directly thereon. The griddle 378 may include a border portion 396 extending around at least a portion of the cooking surface 394. This configuration may be advantageous from preventing food and/or liquids from spilling off the griddle 378 onto the cooktop 314. When in the lowered position 334, a cooking surface 394 may be substantially flush with the upper surfaces 374 of support members 350 of the grate 326. This configuration may be advantageous for providing a uniform appearance for the cooktop 314.

As illustrated in FIGS. 3 and 4, the griddle 378 is disposed between the first and second grates 326a, 326b. However, other configurations of the cooktop 314 are contemplated without departing from the teachings herein. For example, the cooktop 314 may be configured to include the grate 326 and the griddle 378 and/or the cooktop 314 may be configured to include the first and second grates 326a, 326b and the griddle 378 in a different configuration. It is contemplated that the grate 326 and the griddle 378 may be in any practicable configuration on the cooktop 314 and may be structured to be configured by the user.

Figure 5:
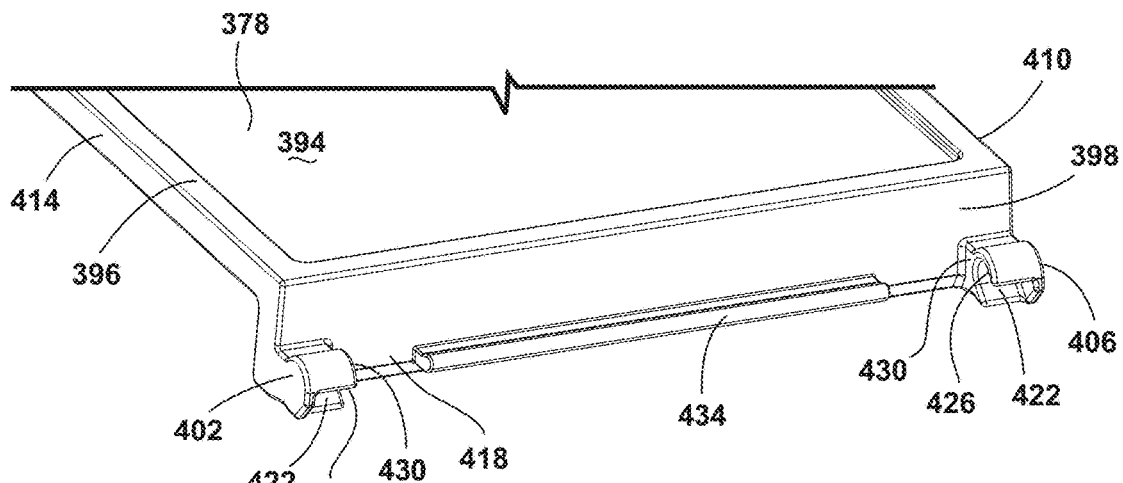
FIG. 5 is a front perspective view of a first end of the griddle of FIG. 4.

Referring to FIG. 5, a first end 398 of the griddle 378 is illustrated. The first end 398 of the griddle 378 may include first and second pivot members 402, 406. The first and second pivot members 402, 406 may be laterally spaced-apart from one another on the first end 398 of the griddle 378. In this way, the first pivot member 402 may be disposed proximate a first side 410 and the second pivot member 406 may be disposed proximate a second side 414 of the griddle 378. The griddle 378 may include a rear wall 418 extending vertically from the cooking surface 394. In such examples, the first and second pivot members 402, 406 may extend from the rear wall 418. Additionally or alternatively, the first and second pivot members 402, 406 may extend from the cooking surface 394. As illustrated in FIG. 5, the first and second pivot members 402, 406 are configured as generally C-shaped receivers. The first and second pivot members 402, 406 configured as C-shaped receivers may each define a receiving slot 422 for accessing a receiving cavity 426. In various examples, an inner face 430 of each of the first and second pivot members 402, 406 may be open to provide access for at least a portion of the coupling member 322 to be inserted into each of the receiving cavities 426.

The griddle 378 may include a retaining protrusion 434 (FIG. 5) extending from the first end 398. In various examples, the retaining protrusion 434 may be an elongated ridge extending at least partially between the first and second pivot members 402, 406. The retaining protrusion 434 may extend the entire distance between the first and second pivot members 402, 406, or alternatively, may extend a portion of the distance therebetween. Alternatively, the retaining protrusion 434 may extend from the rear wall 418. The retaining protrusion 434 may extend from the cooking surface 394 of the griddle 378. In various examples, the first and second pivot members 402, 406 and the retaining protrusion 434 may be substantially horizontally aligned with one another along the rear wall 418. As discussed further below, the retaining protrusion 434 is configured to physically interact with the coupling member 322.

Figure 6:
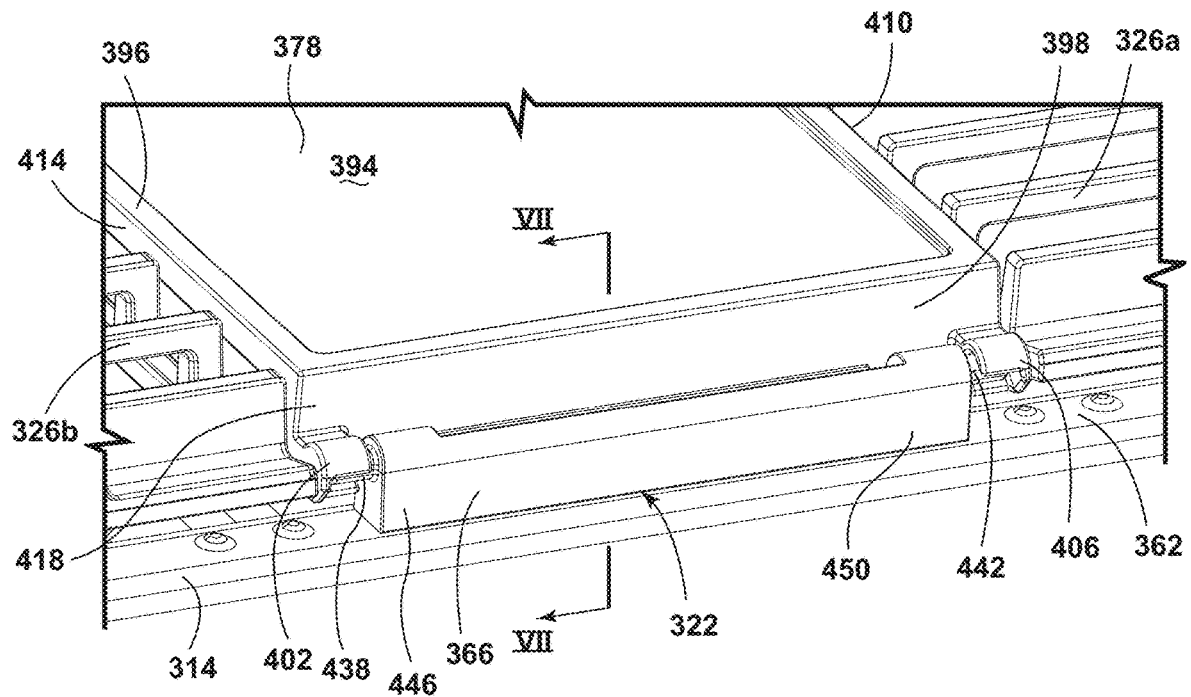
FIG. 6 is a rear perspective view of a cooktop with a griddle associated with a coupling member, according to the present disclosure.

Referring now to FIG. 6, the first and second pivot members 402, 406 may engage the coupling member 322. In various examples, the coupling member 322 may include the body 366 and first and second pins 438, 442 extending from the body 366. The first pin 438 may extend from a first end 446 of the body 366 in a first direction and the second pin 442 may extend from a second end 450 of the body 366 in a second opposing direction. In this way, the first and second pins 438, 442 may extend outwardly in opposing directions from the body 366 of the coupling member 322.

The first and second pivot members 402, 406 of the griddle 378 may engage the first and second pins 438, 442. In this configuration, the griddle 378 may rotate between the raised and lowered positions 330, 334 (FIG. 4). The first and second pins 438, 442 may be inserted into the receiving cavities 426 (FIG. 5) of the first and second pivot members 402, 406 via the receiving slots 422. Based on the location of the receiving slots 422, the griddle 378 may be configured to engage and disengage the coupling member 322 when in the raised position 330, the lowered position 334, and/or at a position therebetween. In this way, the receiving slots 422 receive the first and second pins 438, 442 of the coupling member 322 to selectively couple the griddle 378 to the cooktop 314. Stated differently, the griddle 378 may be selectively engaged with the first and second pins 438, 442, such that the griddle 378 may be assembled to the cooktop 314, disassembled from the cooktop 314, and/or positioned in different locations on the cooktop 314.

Figure 7:
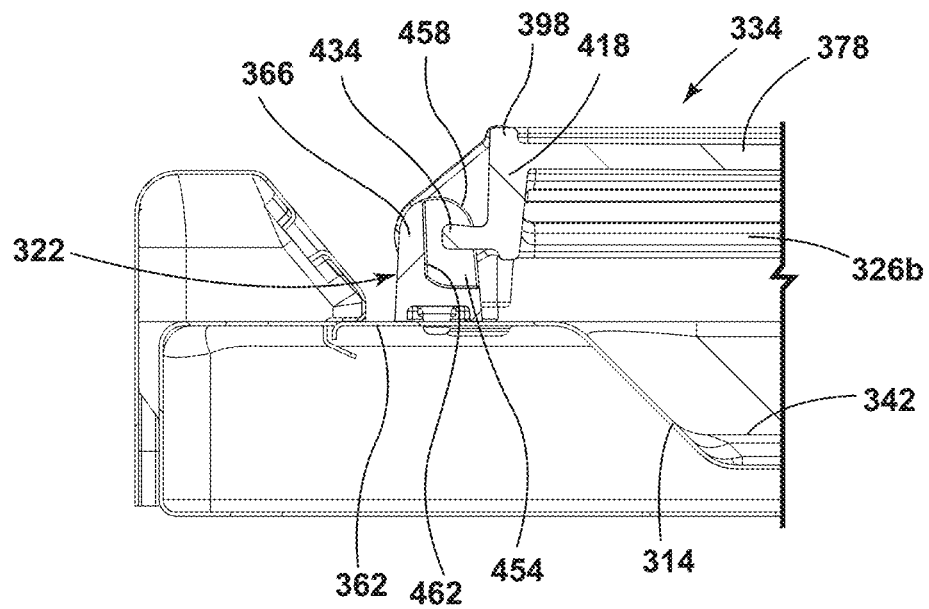
FIG. 7 is a cross-sectional view of the griddle associated with the coupling member of FIG. 6 taken along line VII-VII.

Referring to FIGS. 6 and 7, the body 366 may define a centrally-disposed cutout 454. The cutout 454 may be defined on an inner surface 458 of the body 366, facing toward the burner 318. The cutout 454 may extend between the first and second pins 438, 442. The retaining protrusion 434 on the griddle 378 may be disposed within the cutout 454 of the body 366 of the coupling member 322. In various examples, the griddle 378 may rotate between the raised and lowered positions 330, 334, with minimal or no interference by the retaining protrusion 434. As the griddle 378 rotates between the raised and lowered positions 330, 334, the retaining protrusion 434 rotates within the cutout 454 with the griddle 378.

Referring to FIG. 7, according to various aspects, the coupling member 322 may include an abutting surface 462 within the cutout 454. When the griddle 378 is in the lowered position 334, the retaining protrusion 434 may extend substantially horizontally into the cutout 454. The retaining protrusion 434 may be spaced-apart from the abutting surface 462 of the coupling member 322. The retaining protrusion 434 may be substantially linear, or alternatively, may be curved or arcuate for engaging the abutting surface 462 when the griddle 378 in the raised position 330. Further, the configuration of the retaining protrusion 434 may provide for free rotation of the griddle 378, without interference from the retaining protrusion 434.

Figure 8:
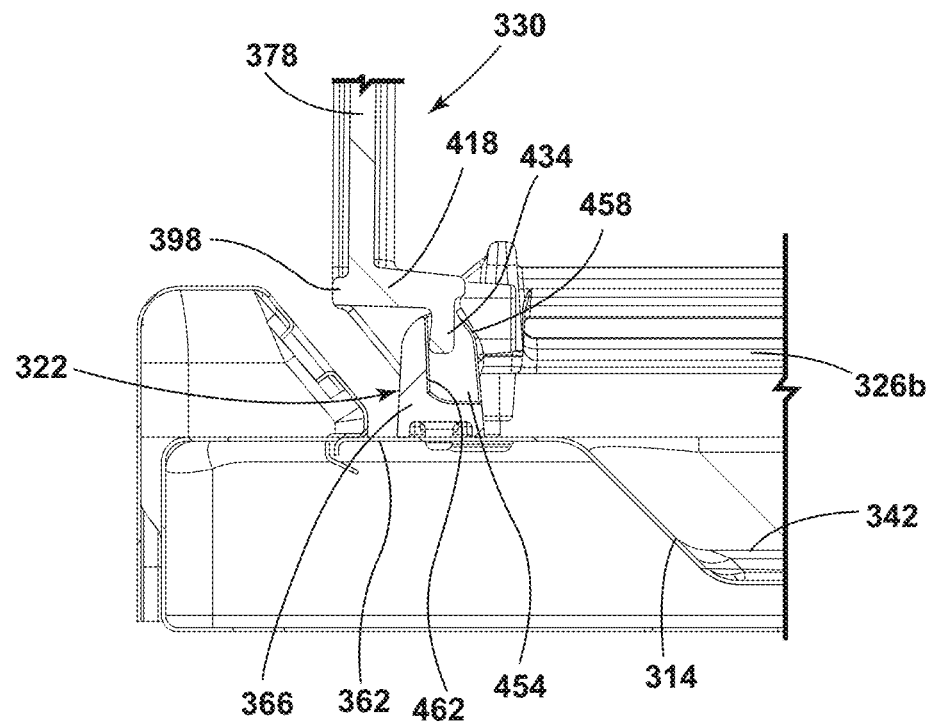
FIG. 8 is an additional cross-sectional view of the griddle associated with the coupling member of FIG. 6 taken along line VII-VII.

Referring to FIG. 8, when the griddle 378 is in the raised position 330, the retaining protrusion 434 may extend substantially vertically downward from the rear wall 418 into the cutout 454. The retaining protrusion 434 may engage and/or abut the abutting surface 462 of the body 366 of the coupling member 322. The engagement between the retaining protrusion 434 and the abutting surface 462 may retain the griddle 378 in the raised position 330. In this way, the retaining protrusion 434 may prevent the griddle 378 from rotating beyond the raised position 330 and may prevent disengagement of the griddle 378 from the cooktop 314. Stated differently, the griddle 378 may include the retaining protrusion 434, which can engage the coupling member 322 when the griddle 378 is in the raised position 330 to retain the griddle 378 in the raised position 330.

Referring to FIGS. 3-8, the cooktop 314 may include multiple coupling members 322. One coupling member 322 may be associated with the grate 326 and an additional coupling member 322 may be associated with the griddle 378. In this way, one coupling member 322 may selectively engage each grate 326 and another coupling member 322 may selectively engage the griddle 378. Based on the configuration of the cooktop 314, the position of the grate 326 and the griddle 378 may be interchanged, such that each of the coupling members 322 included in the cooktop 314 may selectively receive the grate 326 and the griddle 378, respectively.

Figure 9A:
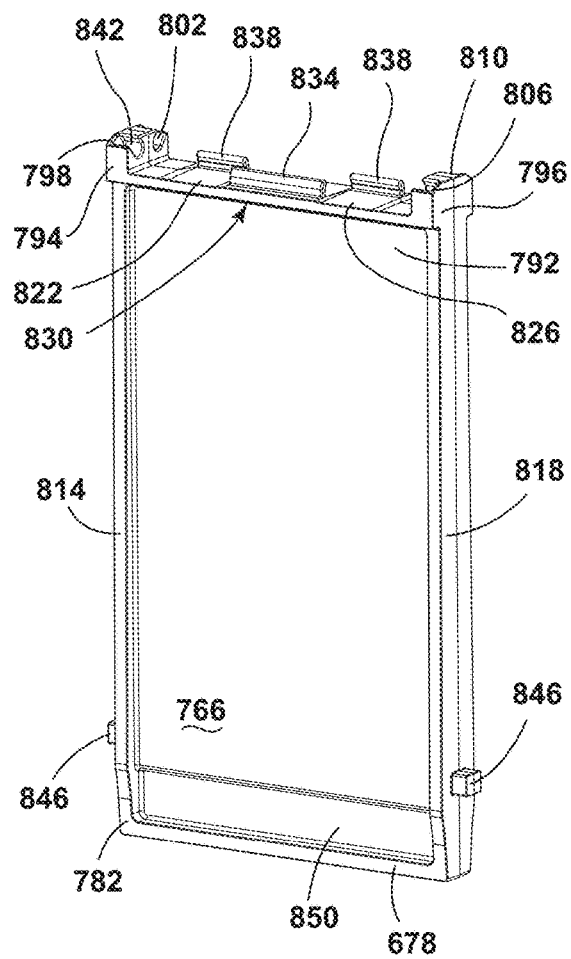
FIG. 9A is a top perspective view of a first surface of a reversible hinged griddle, according to the present disclosure.
Figure 9B:
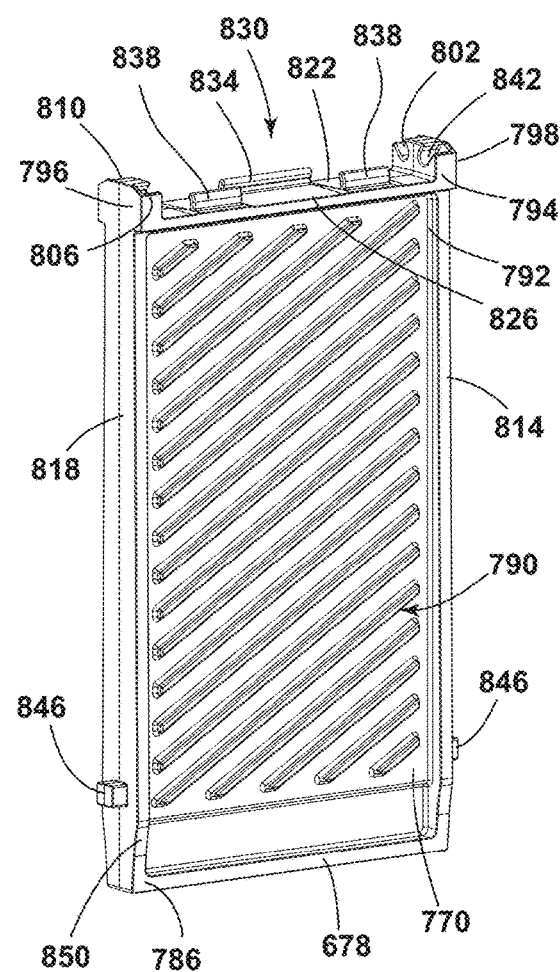
FIG. 9B is a top perspective view of a second surface of the reversible hinged griddle of FIG. 9A, according to the present disclosure.

Referring now to FIGS. 9A and 9B, an additional and/or alternative configuration of a reversible griddle 678 and a cooktop 614 (FIGS. 10-18) are illustrated (with similar features indicated by similar numbers increased by 300). The reversible griddle 678 may include a first surface 766 and a second surface 770 opposing the first surface 766. In various examples, the first and second surfaces 766, 770 of the reversible griddle 678 may both be configured as cooking surfaces for supporting the cooking article and/or cooking food directly thereon. According to various aspects, the first surface 766 of the reversible griddle 678 may correspond to a griddle surface that is exposed when the reversible griddle 678 is in a first side use position 774 (FIG. 12). The first surface 766 may be a substantially planar continuous surface. The second surface 770 of the reversible griddle 678 may correspond to a grill surface that is exposed when the reversible griddle 678 is in a second side use position 778 (FIG. 15). Additionally or alternatively, the first surface 766 may include a first border 782 extending above the griddle surface for containing food and/or liquid thereon. The second surface 770 may include a second border 786 extending around at least a portion of the grill surface. The second surface 770 configured as the grill surface may include a plurality of ribs 790 extending across the second surface 770. As illustrated in FIG. 9B, the plurality of ribs 790 are arranged in a diagonal pattern, however, it is contemplated that any practicable configuration of the plurality of ribs 790 may be used on the second surface 770. The plurality of ribs 790 may extend above the second surface 770. In various examples, the plurality of ribs 790 and the second border 786 may extend the same distance above the second surface 770. Alternatively, the plurality of ribs 790 and the second border 786 may extend different distances from the second surface 770.

Figure 10:
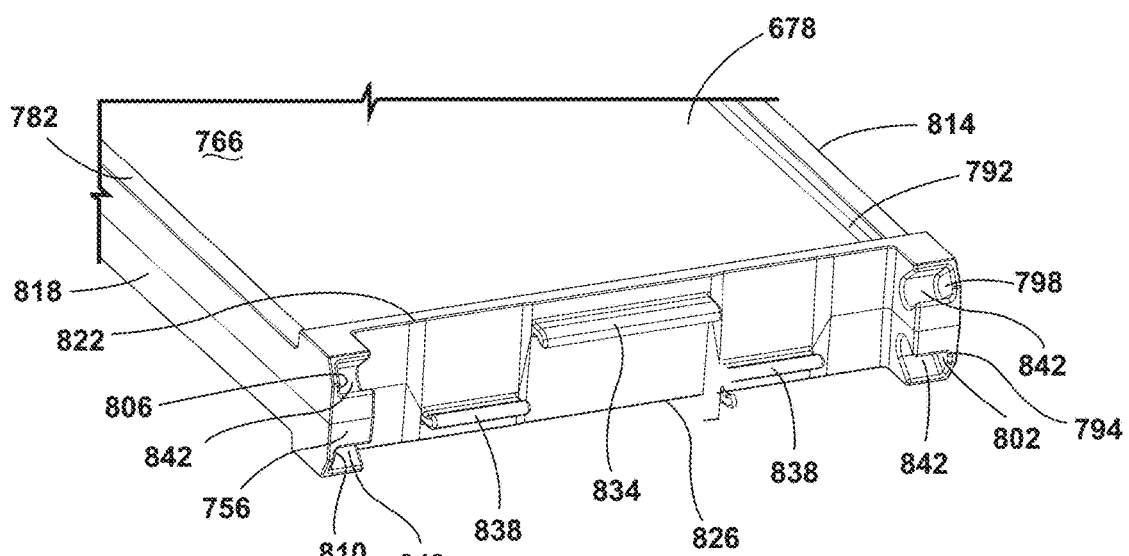
FIG. 10 is a rear perspective view of a first end of a reversible hinged griddle, according to the present disclosure.

Referring to FIG. 10, a first end 792 of the reversible griddle 678 is illustrated. According to various aspects, the reversible griddle 678 may include first and second pivot members 794, 796 extending from the first end 792. The first pivot member 794 may include a first upper pivot member 798 and a first lower pivot member 802 extending from the first end 792 of the reversible griddle 678. The second pivot member 796 may include a second upper pivot member 806 and a second lower pivot member 810 extending from the first end of the reversible griddle 678. The first upper and lower pivot members 798, 802 may be spaced-apart from the second upper and lower pivot members 806, 810 on the first end 792 of the reversible griddle 678. Additionally or alternatively, the first upper and lower pivot members 798, 802 may be disposed proximate a first side 814 of the reversible griddle 678. In such examples, the second upper and lower pivot members 806, 810 may be disposed proximate a second side 818 of the reversible griddle 678. In various examples, the first and second upper pivot members 798, 806 may be disposed proximate a first edge 822 of the reversible griddle 678. In various examples, the first edge 822 may be disposed adjacent to the first surface 766 (e.g., the griddle surface) (FIG. 9B) of the reversible griddle 678. In such examples, the first and second lower pivot members 802, 810 may be disposed proximate a second edge 826 of the reversible griddle 678 and the second edge 826 may be disposed adjacent to the second surface 770 (e.g., the grill surface) of the reversible griddle 678. However, based on the position of the reversible griddle 678 in the first side use position 774 (FIG. 12) or the second side use position 778 (FIG. 15), the orientation of the first and second upper and lower pivot members 798, 802, 806, 810 may be reversed. In this way, the first and second upper pivot members 798, 806 may be disposed proximate the second surface 770 and the first and second lower pivot members 802, 810 may be disposed proximate to the first surface 766.

As illustrated in FIG. 10, the first and second upper pivot members 798, 806 may extend beyond the first border 782 of the reversible griddle 678. Additionally or alternatively, the first and second lower pivot members 802, 810 may extend beyond the second border 786 of the reversible griddle 678. This configuration may be advantageous for preventing and/or minimizing interference of the various components disposed proximate the first end 792 of the reversible griddle 678 as the reversible griddle 678 rotates.

In various examples, the reversible griddle 678 may include a retaining protrusion 830 (FIG. 9B) that extends between the first and second sides 814, 818 of the first end 792 of the reversible griddle 678 to prevent disengagement of the reversible griddle 678. The reversible griddle 678 may include at least one first edge-retaining protrusion 834 and at least one second edge-retaining protrusion 838 disposed proximate the first and second edges 822, 826, respectively. As illustrated in FIG. 10, the reversible griddle 678 includes a single first edge-retaining protrusion 834 generally vertically aligned between two second edge-retaining protrusions 838. Stated differently, the two second edge-retaining protrusions 838 may be spaced-apart from one another and the first edge-retaining protrusion 834 may vertically aligned with the space between the two second edge-retaining protrusions 838. Moreover, the first edge-retaining protrusion 834 and the second edge-retaining protrusions 838 may be vertically offset from one another. In this way, the first edge-retaining protrusion 834 may be generally horizontally aligned with the first and second upper pivot members 798, 806. The second edge-retaining protrusions 838 may horizontally aligned with the first and second lower pivot members 802, 810. The first edge-retaining protrusion 834 and the second edge-retaining protrusions 838 may extend the same distance from the first end 792, or alternatively, may extend different distances from the first end 792 of the reversible griddle 678 to correspond with different respective upper positions associated with the surfaces 766, 790.

Figure 11:
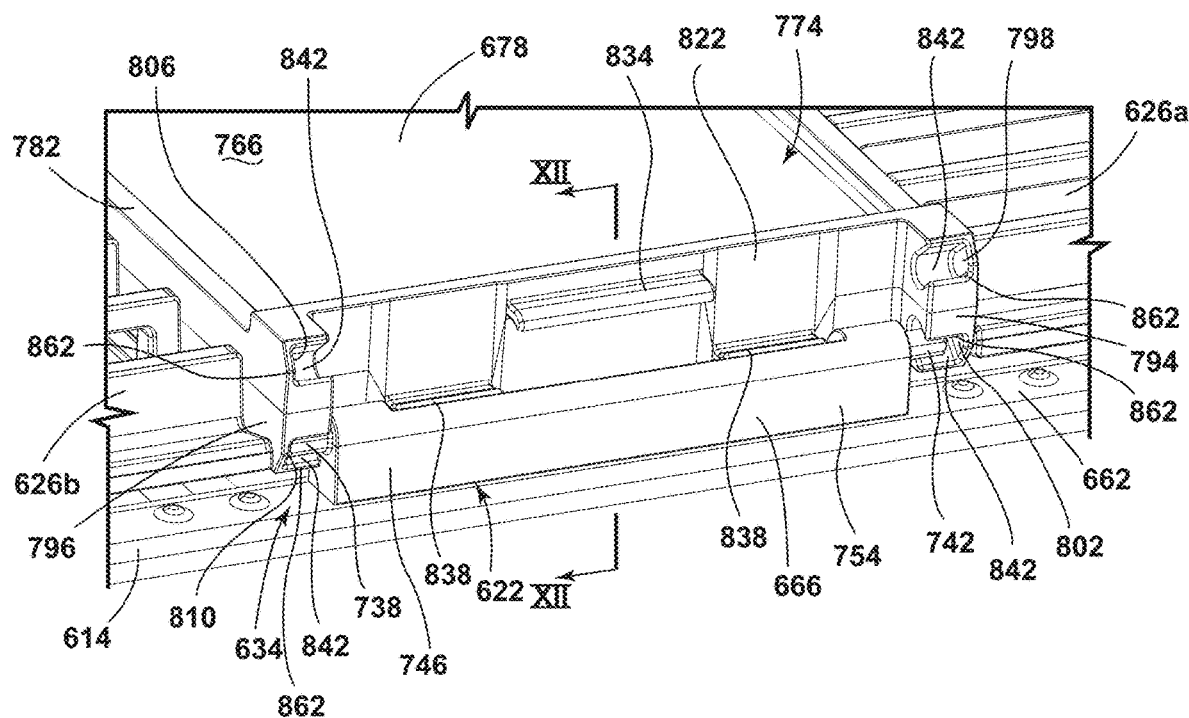
FIG. 11 is a rear perspective view of a cooktop with a reversible hinged griddle associated with a coupling member, according to the present disclosure.
Figure 12:
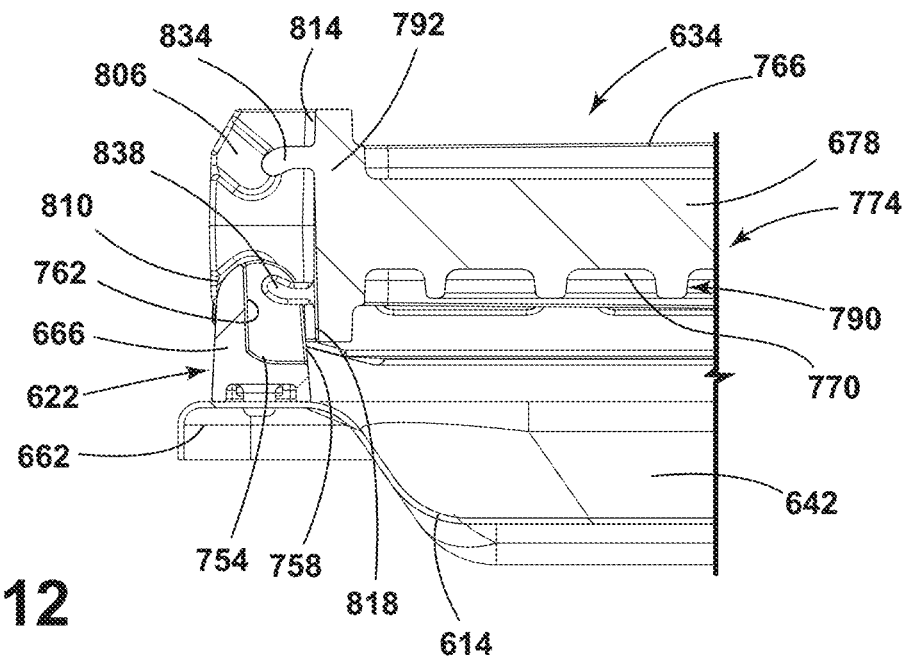
FIG. 12 is a cross-sectional view of the reversible hinged griddle associated with the coupling member of FIG. 11 taken along line XII-XII.

Referring to FIG. 11, the reversible griddle 678 may be selectively coupled with a coupling member 622. The first upper and lower pivot members 798, 802 and the second upper and lower pivot members 806, 810 may each define receiving cavities 842 for selectively receiving the first and second pins 738, 742 of the coupling member 622. The coupling member 622 may include a body 666 and the first and second pins 738, 742 that extends outward in opposing directions therefrom. The body 666 may define the cutout 754, which may accommodate at least one of the first edge-retaining protrusion 834 and the second edge-retaining protrusions 838.

Referring to FIGS. 9A, 9B, and 11, the reversible griddle 678 may include tabs 846 that extends laterally outward from the first and second sides 814, 818 of the reversible griddle 678. The tabs 846 may be spaced-apart from the first end 792 and may be disposed proximate a second end 850 of the reversible griddle 678. The tabs 846 may abut adjacent grates 626 and/or griddles 378 (FIG. 3) to minimize and/or prevent lateral movement of the grates 626 and/or griddles 378.

As illustrated in FIG. 11, the reversible griddle 678 is positionable in a first side use position 774 with the first surface 766 exposed. When in the first side use position 774, the reversible griddle 678 may engage the coupling member 622 to rotate between raised and lowered positions 630, 634. The first and second pins 738, 742 of the coupling member 622 may be disposed within the receiving cavities 842 of the first and second lower pivot members 802, 810. The second edge-retaining protrusions 838 may extend into the cutout 754 of the coupling member 622 and the first edge-retaining protrusion 834 may extend outward from the reversible griddle 678 above the coupling member 622.

Referring still to FIG. 11, the first pivot member 794 may include the first upper and lower pivot members 798, 802 and the second pivot member 796 may include the second upper and lower pivot members 806, 810. Each of the first and second upper pivot members 798, 806 may be laterally spaced-apart from the first and second lower pivot members 802, 810, respectively. Additionally, each of the first upper and lower pivot members 798, 802 and the second upper and lower pivot members 806, 810 may be configured as substantially C-shaped cutouts within the first and second pivot members 794, 796, respectively. In this way, the first pivot member 794 may define two receiving slots 862 for accessing the receiving cavities 842 of the first upper and lower pivot members 798, 802. Similarly, the second pivot member 796 may define two receiving slots 862 for providing access to the receiving cavities 842 of the second upper and lower pivot members 806, 810. The receiving slots 862 may allow insertion of the first and second pins 738, 742 into the selected pivot members (e.g., the first and second upper pivot members 798, 806 or the first and second lower pivot members 802, 810).

Figure 13:
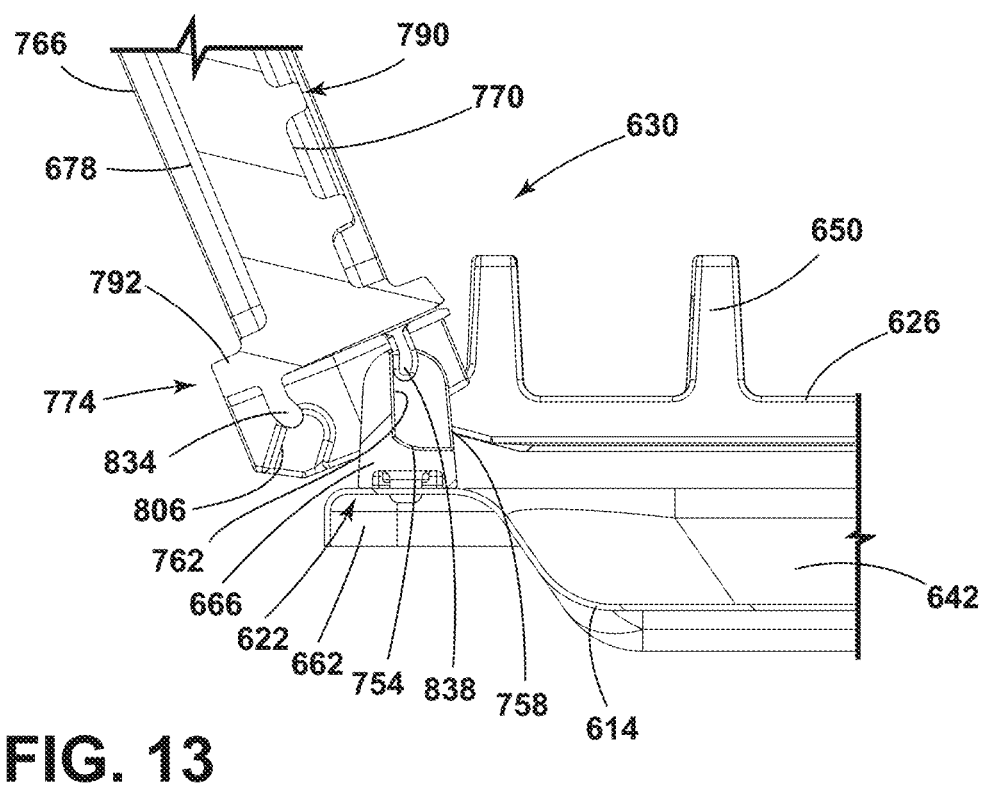
FIG. 13 is an additional cross-sectional view of the reversible hinged griddle and the coupling member of FIG. 11 taken along line XII-XII.

Referring to FIGS. 12 and 13, when the reversible griddle 678 is in the lowered position 634, and the first side use position 774 the second edge-retaining protrusions 838 may extend into the cutout 754 of the coupling member 622. The second edge-retaining protrusions 838 may be spaced-apart from the abutting surface 762 of the coupling member 622. As the reversible griddle 678 is rotated to the raised position 630, the second edge-retaining protrusions 838 rotate with the reversible griddle 678 within the cutout 754. When the reversible griddle 678 is in the fully raised position 630, the second edge-retaining protrusions 838 may engage the abutting surface 762. In this way, the second edge-retaining protrusions 838 may prevent disengagement of the reversible griddle 678 when the reversible griddle 678 is in the first side use position 774. During rotation of the reversible griddle 678, the first edge-retaining protrusion 834 and the second edge-retaining protrusions 838 may remain spaced-apart from the coupling member 622, such that the first and second edge-retaining protrusions 834, 838 may not interfere with the rotation of the reversible griddle 678.

Figure 14:
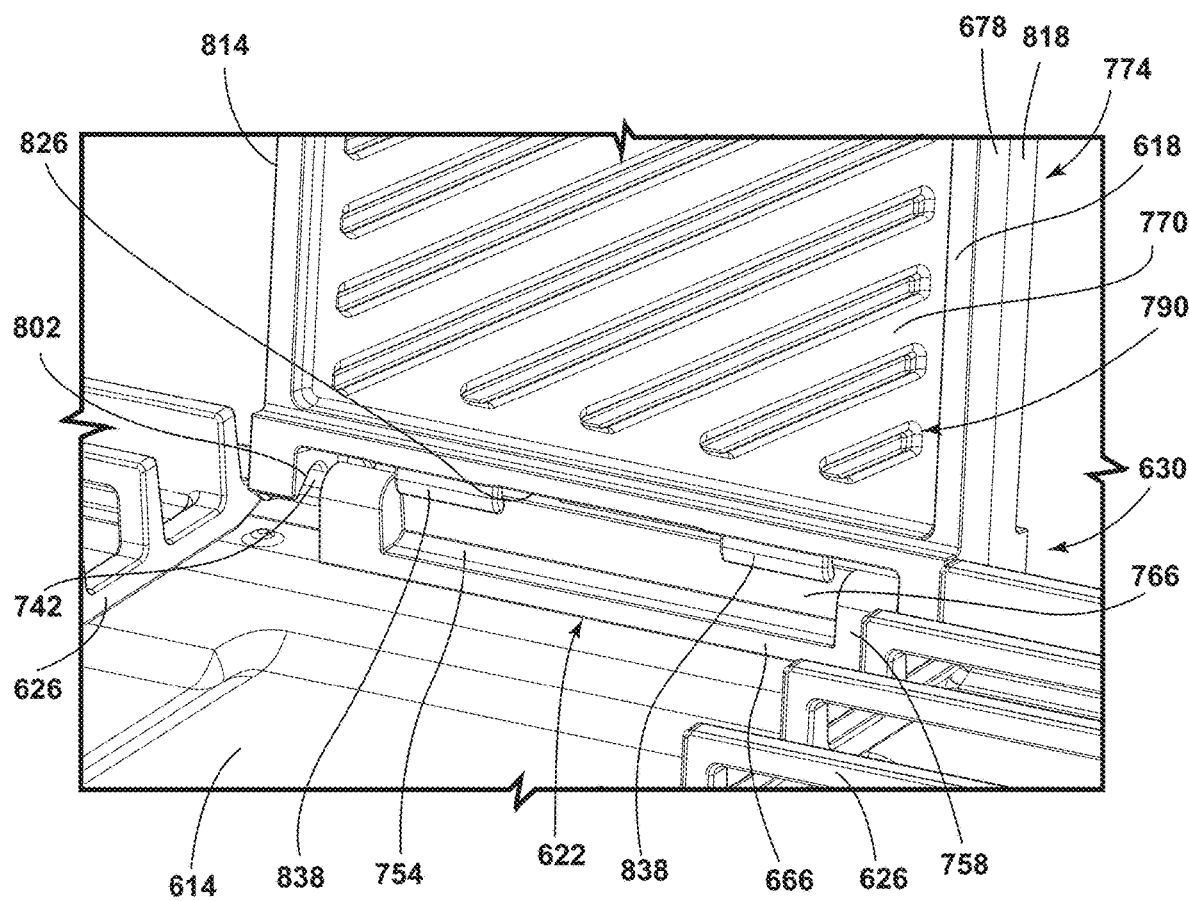
FIG. 14 is a partial front perspective view of a reversible hinged griddle in a first side use position, according to the present disclosure.
Figure 15:
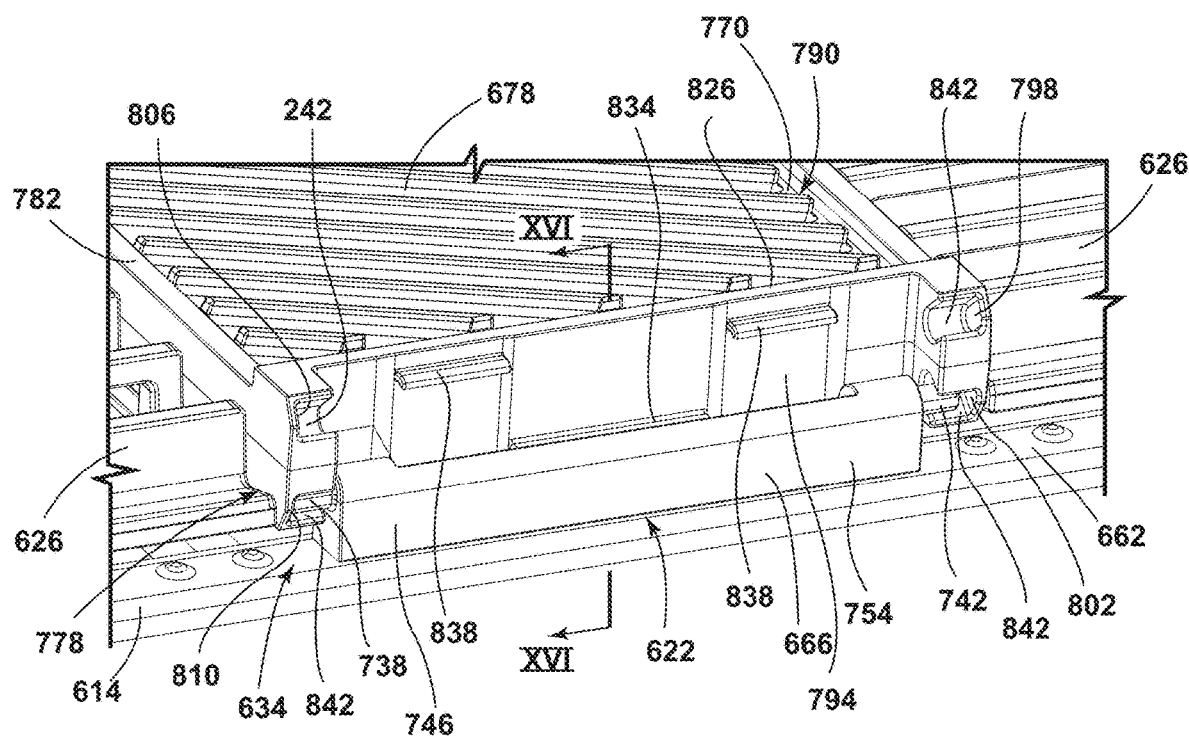
FIG. 15 is a rear perspective view of a cooktop with a reversible hinged griddle and a second side use position, according to the present disclosure.

Referring to FIGS. 13 and 14, when in the raised position 630, the second edge-retaining protrusions 838 may engage the abutting surface 762 within the cutout 754 of the coupling member 622. In this configuration, the second edge-retaining protrusions 838 may retain the reversible griddle 678 in the raised position 630. When in the raised position 630, the reversible griddle 678 may be disposed at an angle greater than 90° relative to a cooktop 614. This arrangement may be advantageous for allowing a force of gravity to at least partially retain the reversible griddle 678 in the raised position 630. Additionally or alternatively, the second edge-retaining protrusions 838 may prevent rotation of the reversible griddle 678 beyond the fully raised position 630. As illustrated in FIGS. 13 and 14, the first edge-retaining protrusion 834 may be spaced-apart from the coupling member 622 when the reversible griddle 678 is in the raised position 630 and the first side use position 774. The first edge-retaining protrusion 834 may extend from the first end 792 of the reversible griddle 678 proximate the coupling member 622 on an opposing side relative to the cutout 754 when the reversible griddle 678 is in the raised position 630. In this way, the first edge-retaining protrusion 834 may not engage the coupling member 622 when the reversible griddle 678 is in the first side use position 774.

Referring to FIG. 15, the reversible griddle 678 is illustrated in a second side use position 778 exposing the second surface 770 (e.g., the grill surface). In this arrangement, the first and second upper pivot members 798, 806 may be disposed proximate the second surface 770 and the first and second lower pivot members 802, 810 may be disposed proximate the first surface 766 (e.g., the griddle surface). Additionally or alternatively, the second edge retaining protrusions 838 may extend between the first and second upper and lower pivot members 798, 806 of the reversible griddle 678 when the reversible griddle 678 is in the second side use position 778. The first edge-retaining protrusion 834 may extend between the first and second lower pivot members 802, 810. When in the second side use position 778, the reversible griddle 678 may engage the coupling member 622 to rotate between the raised and lowered positions 630, 634. The first and second pins 738, 742 of the coupling member 622 may be disposed within receiving cavities 842 of the first and second lower pivot members 802, 810. The first edge-retaining protrusion 834 may extend into the cutout 754 defined by the coupling member 622 and the second edge-retaining protrusions 838 may extend outward from the first end 792 of the reversible griddle 678 above the coupling member 622. The reversible griddle 678 may operate in a similar manner when in the first side use position 774 and the second side use position 778.

Figure 16:
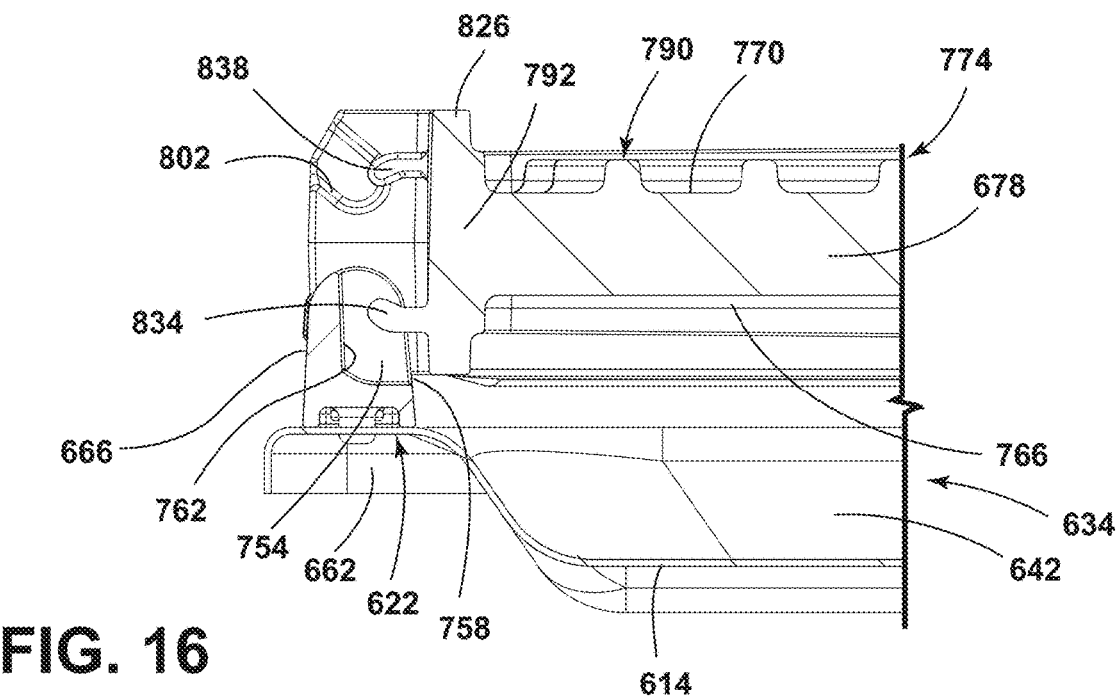
FIG. 16 is a cross-sectional view of the reversible hinged griddle and a coupling member of FIG. 15 taken along line XVI-XVI.
Figure 17:
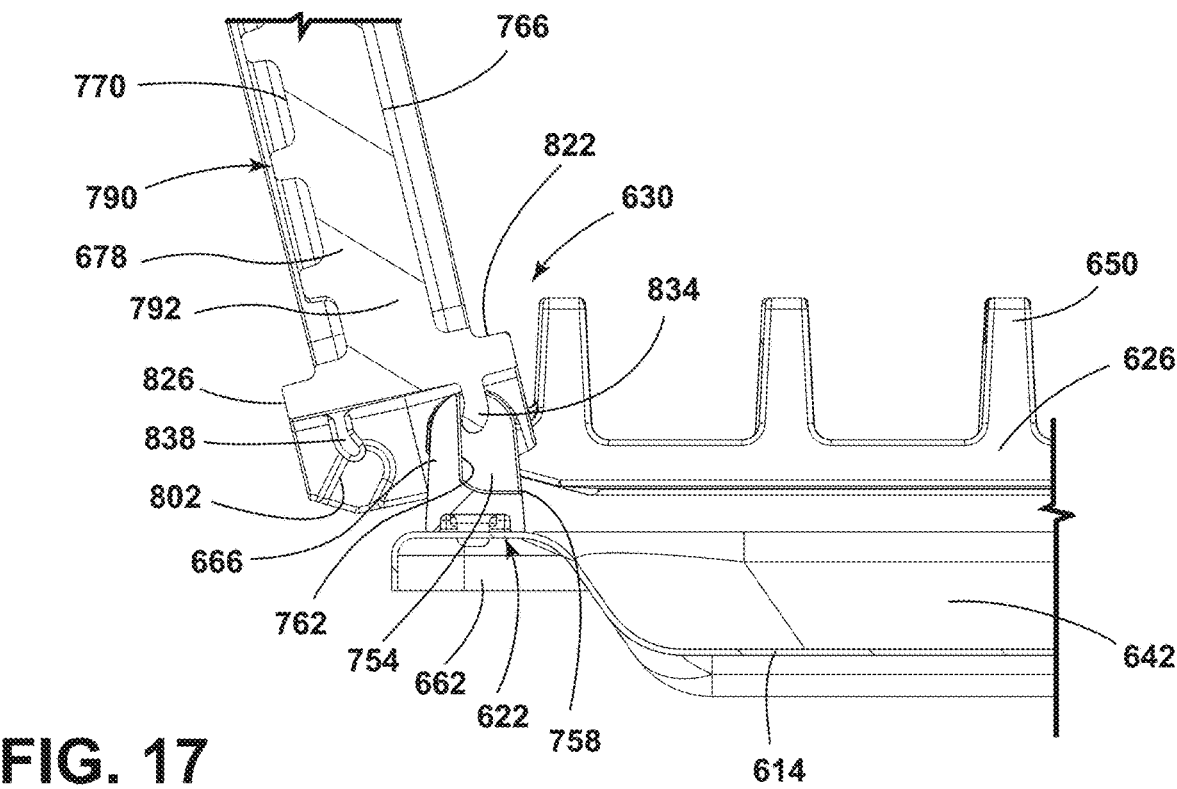
FIG. 17 is an additional cross-sectional view of the reversible hinged griddle and the coupling member of FIG. 15 taken along line XVI-XVI.

Now referring to FIGS. 16 and 17, when the reversible griddle 678 is in the lowered position 634 the first edge-retaining protrusion 834 may extend into the cutout 754 defined by the coupling member 622. The first edge-retaining protrusion 834 may be spaced-apart from the abutting surface 762 within the cutout 754. As the reversible griddle 678 is rotated to the raised position 630, the first edge-retaining protrusion 834 may rotate with the reversible griddle 678 within the cutout 754. As the reversible griddle 678, and correspondingly the first edge-retaining protrusion 834, are rotated, the first edge-retaining protrusion 834 may remain spaced-apart from the abutting surface 762 of the coupling member 622.

Figure 18:
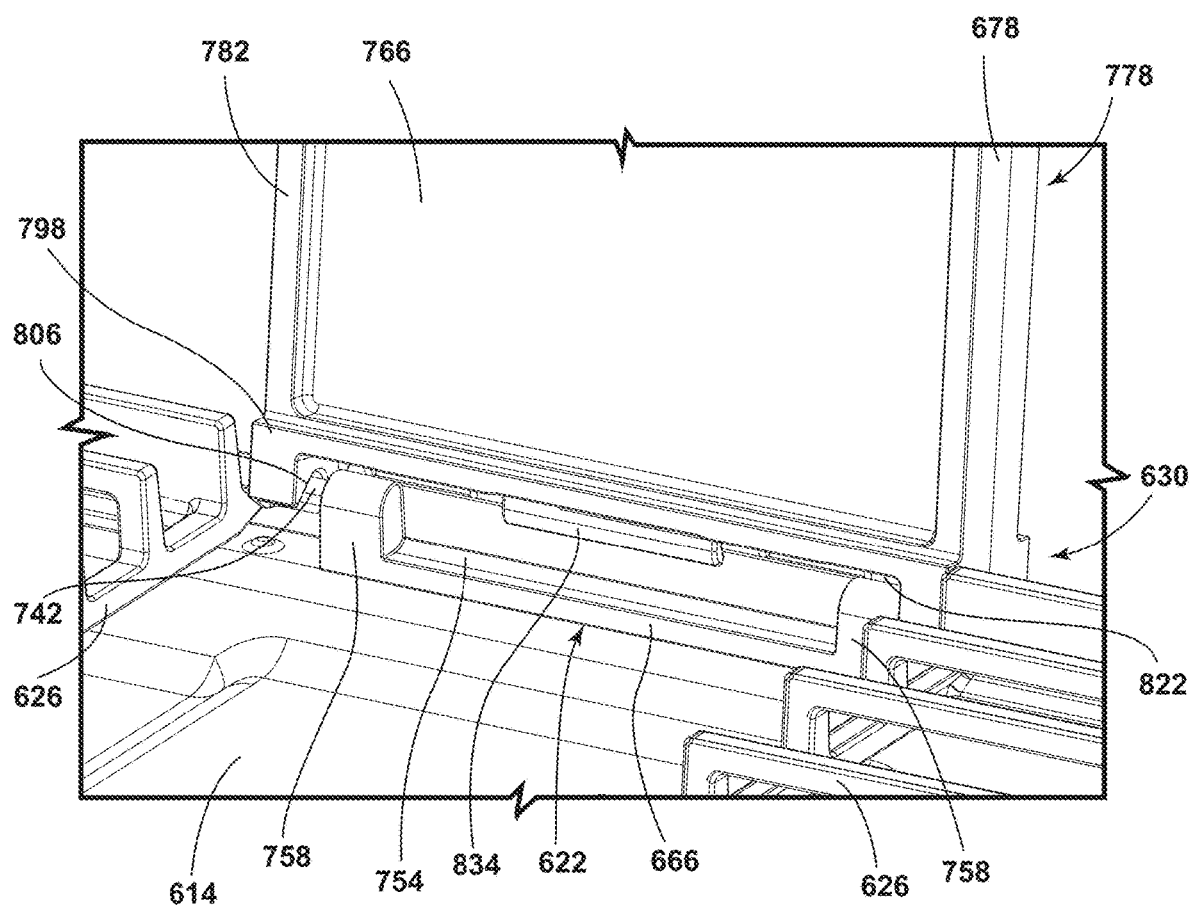
FIG. 18 is a partial front perspective view of a reversible hinged griddle in a second side use position, according to the present disclosure.

Referring to FIGS. 17 and 18, when in the raised position 630, the first edge-retaining protrusion 834 may engage the abutting surface 762 within the cutout 754 of the coupling member 622. In this way, the first edge-retaining protrusion 834 may retain the reversible griddle 678 in the raised position 630. According to various aspects, the first edge-retaining protrusion 834 may prevent rotation of the reversible griddle 678 beyond the fully raised position 630. The first edge-retaining protrusion 834 may also prevent disengagement of the reversible griddle 678 when the reversible griddle 678 is in the second side use position 778. When the reversible griddle 678 is in the raised position 630, the second edge-retaining protrusions 838 may be spaced-apart from the coupling member 622 proximate an opposing side relative to the cutout 754. In this way, the second edge-retaining protrusions 838 may not engage in the coupling member 622 when the reversible griddle 678 is in the second side use position 778.

As can be appreciated based on the above discussion with respect to FIGS. 9A-18, the reversible griddle 678 may be configured as a reversible griddle 678. In this way, the reversible griddle 678 may be used in both the first side use position 774 exposing the first surface 766 and the second side use position 778 exposing the second surface 770. The user may disengage the first and second pivot members 794, 796 from the coupling member 622 and rotate the reversible griddle 678 to expose the selected surface. The first and second pivot members 794, 796, as well as, the first edge-retaining protrusion 834 and the second edge-retaining protrusions 838, may allow the reversible griddle 678 to couple to the coupling member 622 and rotate between the raised and lowered positions 630, 634, when in the first side use position 774 and the second side use position 778. The configuration of the first end 792 of the reversible griddle 678 may be advantageous for providing rotation of the reversible griddle 678 and preventing inadvertent disengagement of the reversible griddle 678 from the coupling member 622. It is also contemplated that the griddle 678 (FIG. 3) may be similarly configured to the reversible griddle 678.

Figure 19:
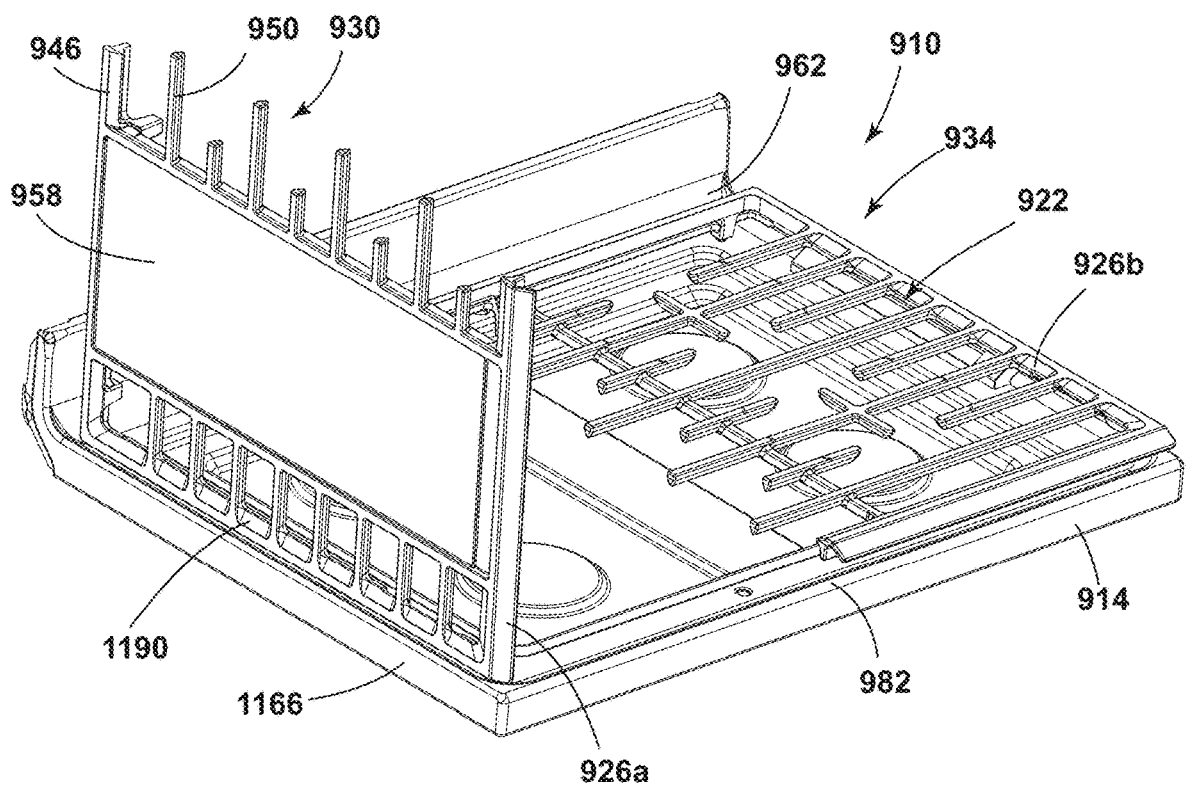
FIG. 19 is a top perspective view of a cooktop with a first hinged grate in a raised position and a second grate in a lowered position, according to the present disclosure.

Referring now to FIG. 19, an additional and/or alternative example of a cooktop 914 is illustrated. The cooktop 914 may include first and second grates 926a, 926b independently rotatable between raised and lowered positions 930, 934. One or both of the first and second grates 926a, 926b may include a griddle portion 958 similar to that which is discussed above with respect to FIG. 2. Alternatively, either or both of the first and second grates 926a, 926b may not include the griddle portion 958 and may include support members 950 and a frame 946. According to various aspects, a coupling member 922 may be disposed proximate a side edge 1166 of the cooktop 914. The grate 926 may engage the coupling member 922 and may rotate about the coupling member 922. In this way, the user may rotate the grate 926 upwards and out relative to the cooktop 914 to rotate the grate 926 from the lowered position 934 to the raised position 930 and downwards and in towards the lowered position 934. The grate 926 may include support features 944 for supporting the grate 926 on the cooktop 914 when in the lowered position 934.

Figure 20:
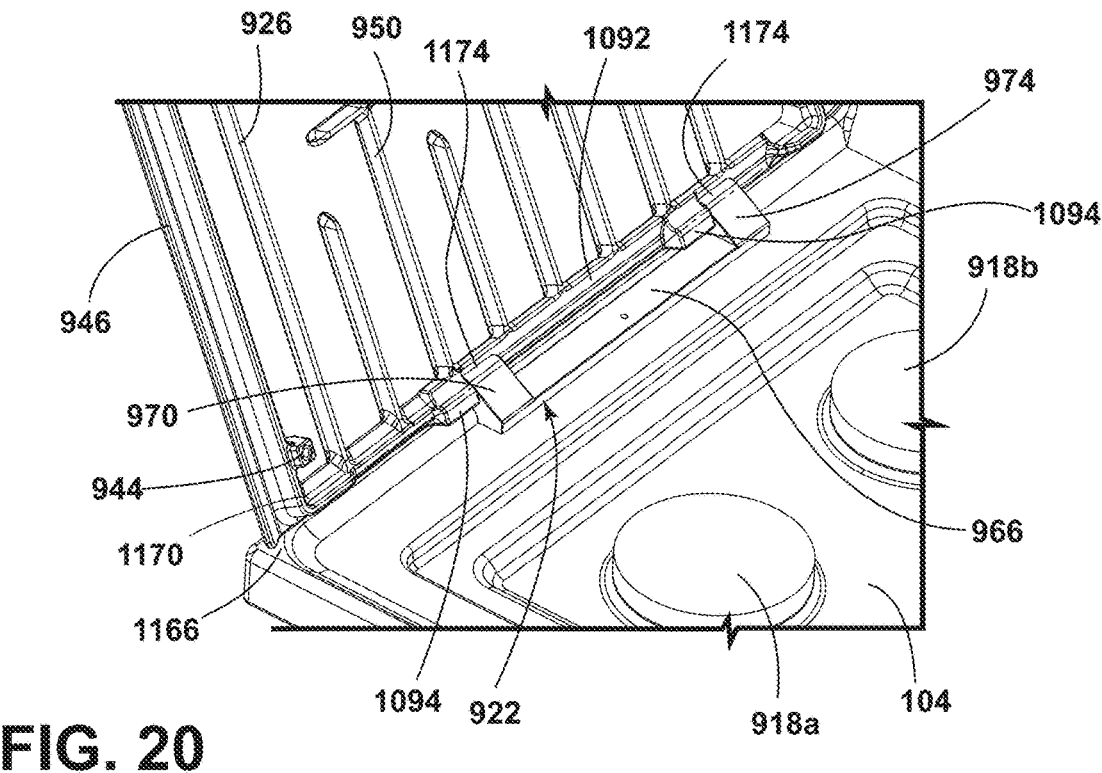
FIG. 20 is a partial top perspective view of a cooktop with a grate in a raised position, according to the present disclosure.
Figure 21:
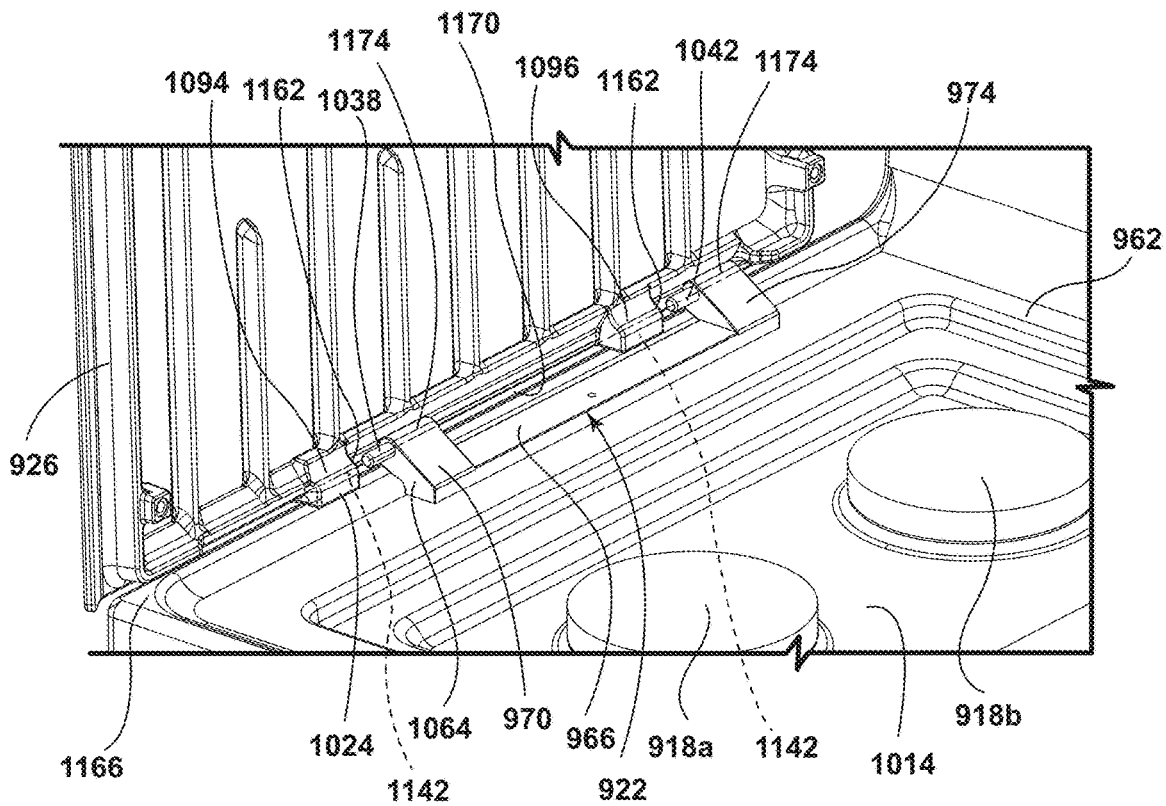
FIG. 21 is a partial side perspective view of a grate disengaged from a coupling member on a cooktop, according to the present disclosure.

Referring to FIGS. 20 and 21, the coupling member 922 may include a body 966 and first and second supports 970, 974 extending upward therefrom. In this way, a first pin 1038 may extend outward from the body 966 and a second pin 1042 may extend over the body 966. Additionally or alternatively, the coupling member 922 may define a space between the first and second supports 970, 974. Stated differently, the first and second supports 970, 974 extend vertically upward from the body 966 and may be spaced-apart from one another. The first pin 1038 may extend from the first support 970, and the second pin 1042 may extend from the second support 974. In various examples, the first and second pins 1038, 1042 may both extend in the first direction. The first direction may be toward a front edge 982 (FIG. 19), toward a rear edge 962, or toward the side edge 1166 of the cooktop 914 based on the configuration of the cooktop 914 and the location of the coupling member 922.

The grate 926 may include first and second pivot members 1094, 1096 extending from the first end 1092 of the grate 926. Additionally or alternatively, the first and second pivot members 1094, 1096 may extend from a lower surface 1170 of the grate 926. The first and second pivot members 1094, 1096 may be configured as projections that define the respective receiving cavity 1142 therein. In this way, the first and second pivot members 1094, 1096 may not include receiving slots 1162.

Additionally or alternatively, the size and/or shape of the receiving cavities 1142 may substantially correspond with the size and/or shape of the first and second pins 1038, 1042. The first and second pins 1038, 1042 may be configured to be received within the receiving cavities 1142 of the first and second pivot members 1094, 1096 when the grate 926 is engaged with the coupling member 922. In various examples, the grate 926 may be disposed such that the first and second pivot members 1094, 1096 align with the first and second pins 1038, 1042. The grate 926 may be shifted in the second direction, which is the opposing direction relative to the first and second pins 1038, 1042. In this way, the grate 926 may be slidably engaged with the coupling member 922. Depending on the configuration of the first and second pivot members 1094, 1096, the grate 926 may be slidably engaged with the coupling member 922 to be assembled to the cooktop 914 when the grate 926 is in the raised position 930 (FIG. 19), the lowered position 934 (FIG. 19), and/or any positioned therebetween. To disengage the grate 926 from the cooktop 914, the grate 926 may be moved in the first direction to disengage the first and second pivot members 1094, 1096 from the first and second pins 1038, 1042. The space defined between the first and second supports 970, 974 may be advantageous for accommodating the sliding engagement between the grate 926 and the coupling member 922.

Figure 22:
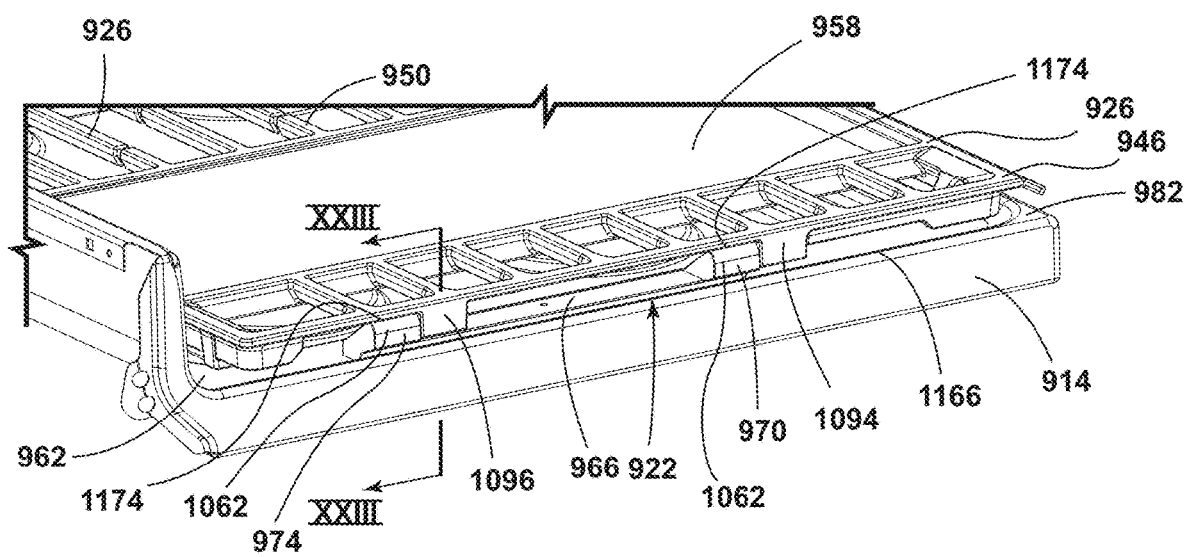
FIG. 22 is a partial side perspective view of a grate associated with a coupling member of a cooktop, according to the present disclosure.

Referring to FIGS. 21 and 22, the first and second supports 970, 974 may have a variety of configurations. As illustrated in FIG. 21, the first and second supports 970, 974 may have substantially triangular cross-sectional shapes. An upper surface 1174 of each of the first and second supports 970, 974 may be substantially sloping to guide the movement of the grate 926 as the grate 926 rotates between the raised and lowered positions 930, 934. As illustrated in FIG. 22, the first and second supports 970, 974 may include the sloping upper surface 1174 and an abutting surface 1062 on an outer face thereof.

Figure 23:
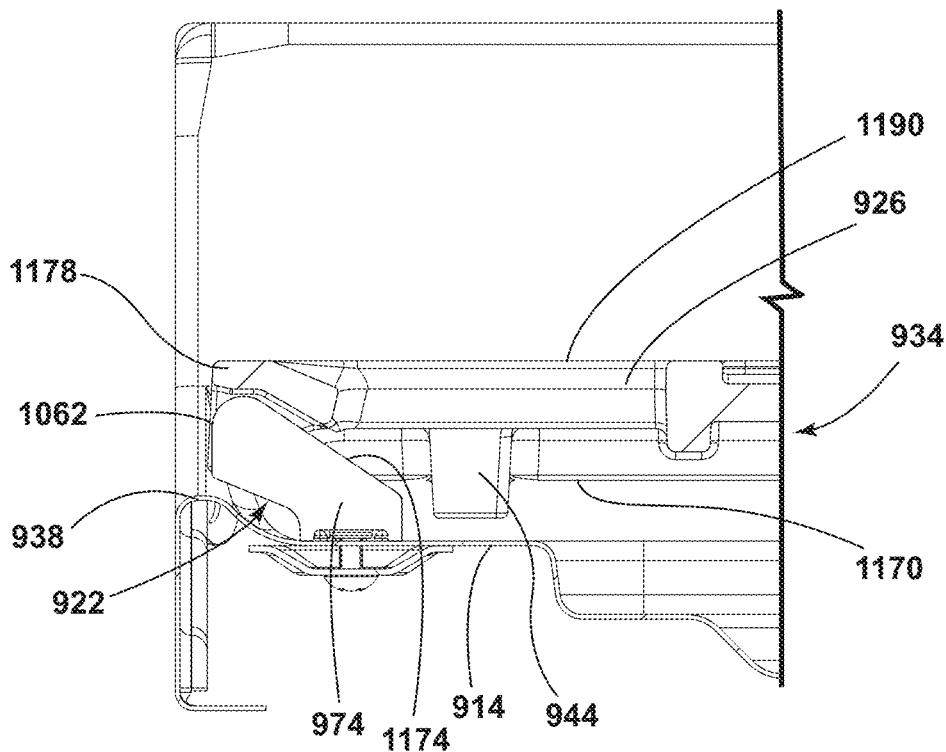
FIG. 23 is a cross-sectional view of the grate associated with the coupling member of FIG. 22 taken along line XXIII-XXIII.
Figure 24:
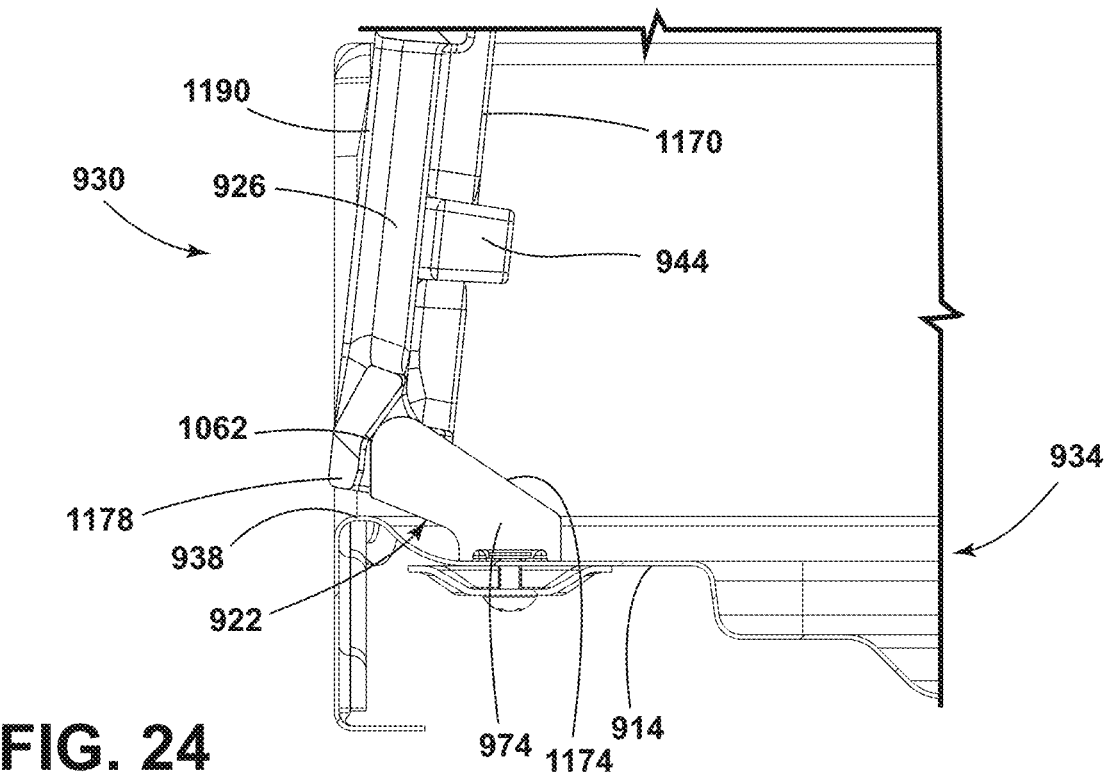
FIG. 24 is a cross-sectional view of the grate with the coupling member of FIG. 22 taken along line XXIII-XXIII.

Referring to FIGS. 22-24, the upper surfaces 1174 of the first and second supports 970, 974 may be sloped to assist in the rotation of the grate 926 between the raised and lowered positions 930, 934. The grate 926 may be slidably engaged with the upper surfaces 1174 while rotating. The abutting surface 1062 of the coupling member 922 may be included on an outer face of the coupling member 922. In various examples, the grate 926 may include an engagement extension 1178 that extends outwardly from at least one of the frame 946 and the support members 950. When the grate 926 is in the lowered position 934, the engagement extension 1178 may extend over the first and second supports 970, 974 and engages the upper surface 1174 of the first and second supports 970, 974. When the grate 926 is in the raised position 930, the engagement extension 1178 may abut and/or engage the abutting surface 1062 of the first and second supports 970, 974 of the coupling member 922. As the grate 926 rotates between the raised and lowered positions 930, 934, the engagement extension 1178 may be slidably engaged with the upper surface 1174 and the abutting surface 1062 to guide the rotation of the grate 926. The coupling member 922 may be positioned on the cooktop 914, such that the grate 926 may be substantially vertically aligned with the peripheral edge 938 of the cooktop 914 when in the raised position 930. It is contemplated that the interaction between the engagement extension 1178 with the upper surface 1174 and the abutting surface 1062 may provide a frictional interference to slow the rotation of the grate 926. It is contemplated that the grate 926 may include the engagement extension 1178 that engages one of the first and second supports 970, 974, or alternatively, both of the first and second supports 970, 974. Further, it is contemplated that the grate 926 may include more than one engagement extension 1178.

Figure 25:
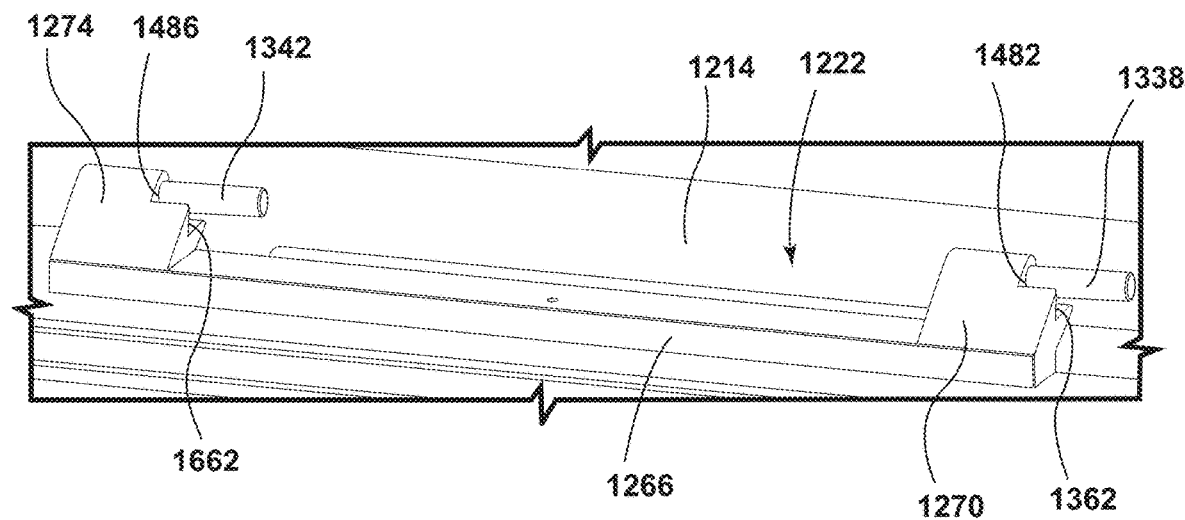
FIG. 25 is a side perspective view of a coupling member for a cooktop, according to the present disclosure.

Referring now to FIG. 25, an additional and/or alternative configuration of a coupling member 1222 and a cooktop 1214 (FIG. 26) are illustrated. The coupling member 1222 may define a first locking cutout 1482 proximate a first pin 1338 and a second locking cutout 1486 proximate a second pin 1342. Stated differently, first and second supports 1270, 1274 of the coupling member 1222 may define the first and second locking cutouts 1482, 1486. The first and second locking cutouts 1482, 1486 may define gaps between the first and second pins 1338, 1342 and abutting surfaces 1362 within each of the first and second locking cutouts 1482, 1486. According to various aspects, the first and second locking cutouts 1482, 1486 may have substantially similar configurations.

Figure 26:
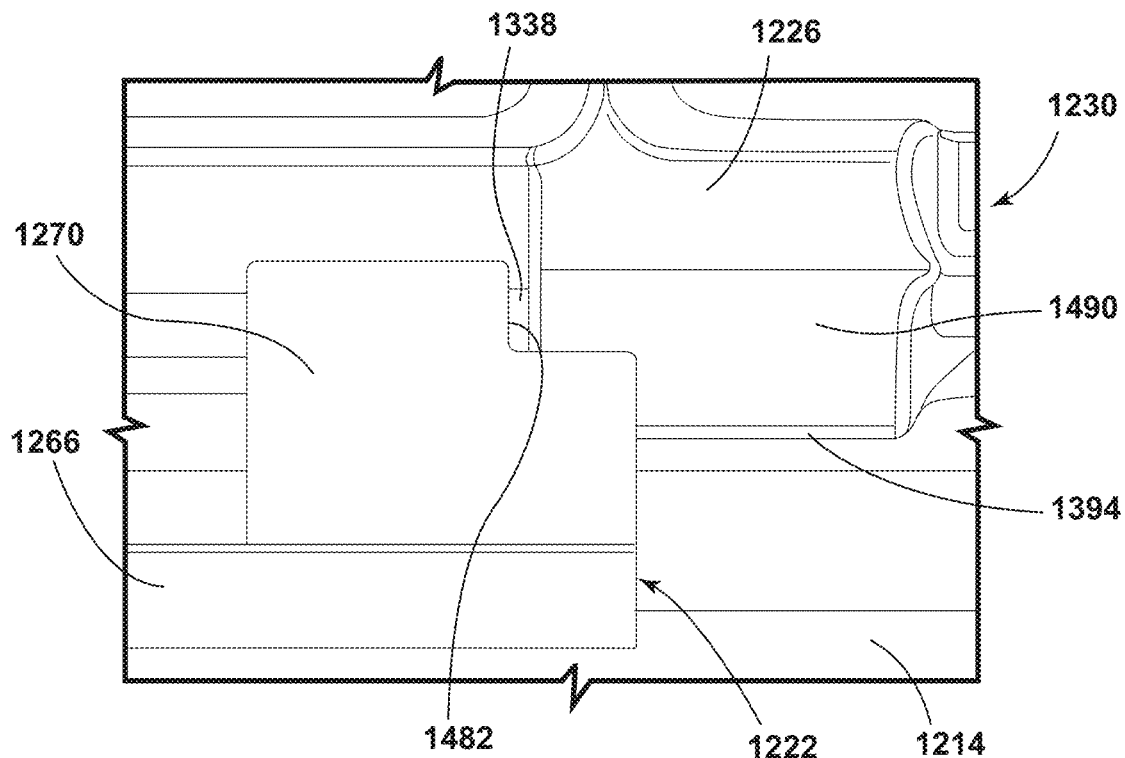
FIG. 26 is a partial side view of a pivot member of a grate positioned within a locking cutout of a coupling member for a cooktop, according to the present disclosure.

Referring to FIGS. 25 and 26, the first and second locking cutouts 1482, 1486 may be configured to receive a grate 1226 when the grate 1226 is in a raised position 1230. In this way, the first and second locking cutouts 1482, 1486 may be shaped and/or sized to accommodate a first and second pivot members 1394, 1396 of the grate 1226. The pivot members 1394, 1396 may engage the first and second pins 1338, 1342 when the grate 1226 is in the raised position 1230. The grate 1226 may be slid in the second direction onto the first and second pins 1338, 1342. When moved further in the second direction when in the raised position 1230, the grate 1226 may be slid into the space defined by the first and second locking cutouts 1482, 1486. An upper surface 1490 of the grate 1226 may engage the abutting surfaces 1362 of the first and second locking cutouts 1482, 1486, to retain the grate 1226 in the raised position 1230. This configuration may also prevent the grate 1226 from rotating beyond the raised position 1230. To rotate the grate 1226 to the lowered position 1234, the grate 1226 may be slid in the first direction along the first and second pins 1338, 1342 to remove the grate 1326 from the space defined by the first and second locking cutouts 1482, 1486. The grate 1226 may then be rotated to the lowered position 1234.

Figure 27:
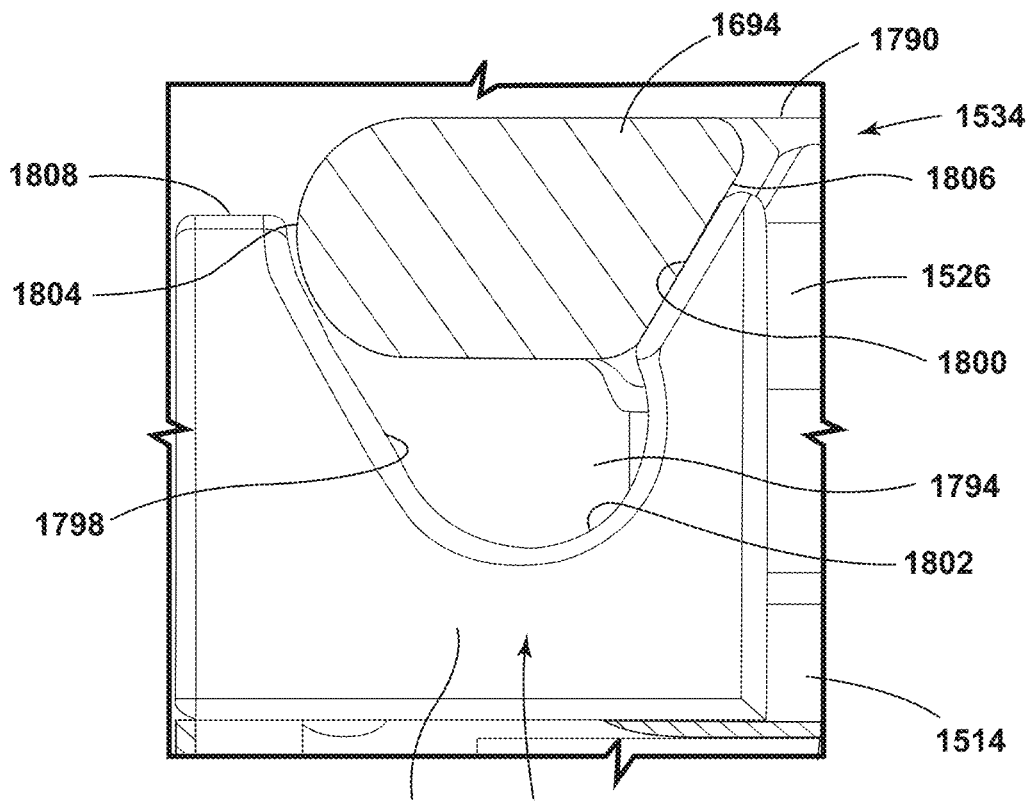
FIG. 27 is a partial view of a grate with a pivot member associated a coupling member for a cooktop, according to the present disclosure.
Figure 28:
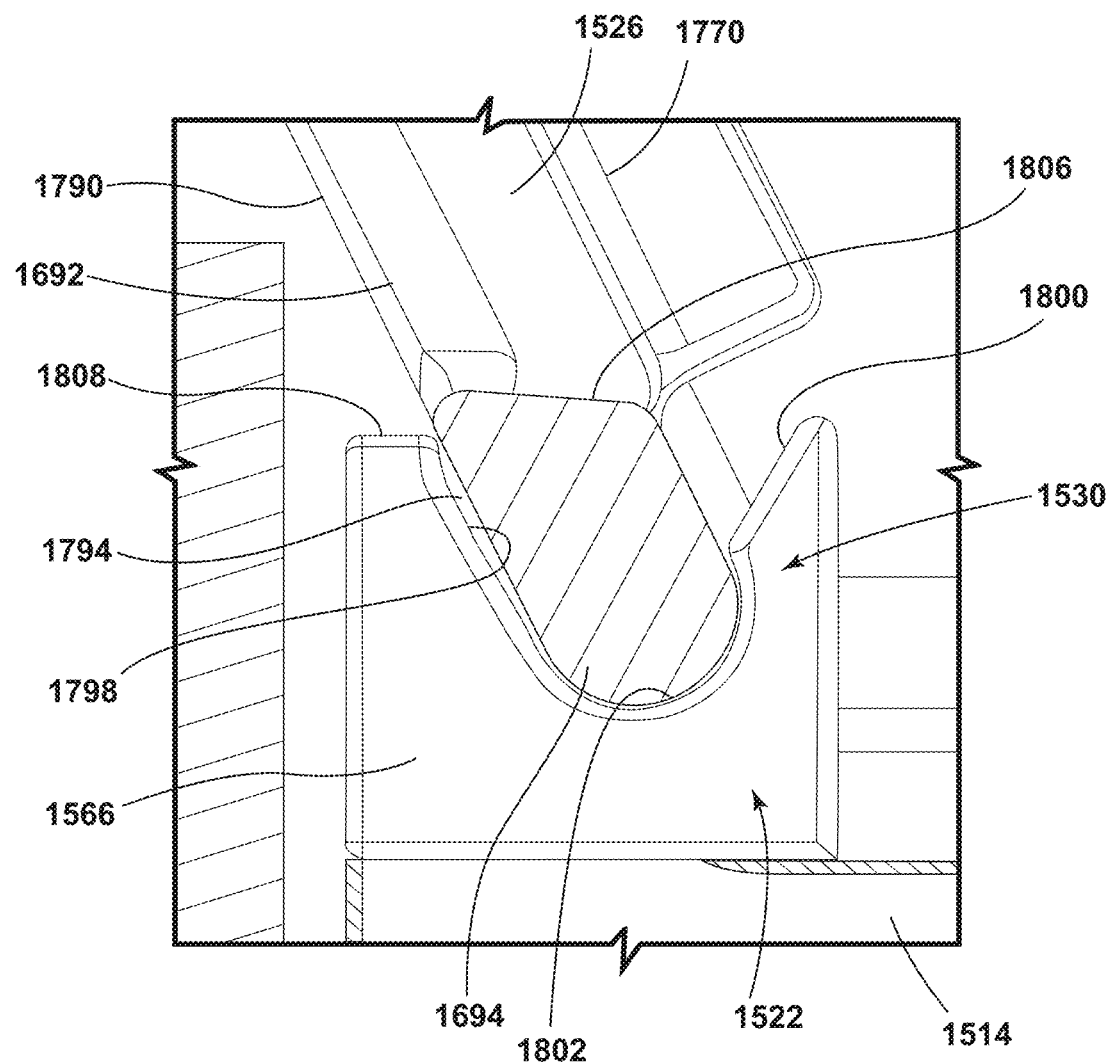
FIG. 28 is a partial view of a grate with a pivot member associated a the coupling member for a cooktop, according to the present disclosure.

Referring to FIGS. 27 and 28, a coupling member 1522 may include a body 1566 defining a cavity 1794. The coupling member 1522 may have a substantially square external shape in cross-section, and the cavity 1794 may extend inwardly into the coupling member 1522 from a top surface thereof. The cavity 1794 may have a substantially asymmetrical shape. According to various aspects, the coupling member 1522 may define the cavity 1794 having a first outwardly angled side 1798 and a second opposing outwardly angled side 1800. The first and second outwardly angled sides 1798, 1800 may be connected via a rounded portion 1802. The rounded portion 1802 may be an extension of the first outwardly angled side 1798. The first outwardly angled side 1798 and the rounded portion 1802 define an obliquely oriented portion of the cavity 1794 within the coupling number 1522. The rounded portion 1802 may extend into the second opposing outwardly angled side 1800 to form an asymmetrical bell-shaped cavity 1794.

As illustrated in FIG. 27, an additional and/or alternative configuration of a cooktop 1514 is illustrated. A first pivot member 1694 is configured as a rounded extension that extends from a first end 1692 of the grate 1526. It is contemplated that the grate 1526 may not include a second pivot member 1696. Alternatively, the second pivot member 1696 may be a substantially similar configuration as the illustrated first pivot member 1694. In examples without the second pivot member 1696, the first pivot member 1694 may be centrally located on the first end 1692 of the grate 1526. Additionally or alternatively, the first pivot member 1694 may extend the same length as the first end 1692 of the grate 1526. In examples with the second pivot member 1696, the first and second pivot members 1694, 1696 may be spaced-apart from one another. In such examples, the coupling member 1522 may define a single cavity 1794 or multiple cavities 1794 to accommodate the first and second pivot members 1694, 1696. Additionally or alternatively still, separate coupling members 1522 may engage the first and second pivot members 1694, 1696.

Referring still to FIG. 27, the first pivot member 1694 may extend from the grate 1526 in a manner such that the first pivot member 1694 may be substantially flush with the upper surface 1790 of the grate 1526. A rounded end 1804 of the first pivot member 1694 may be disposed proximate the first outwardly angled side 1798 when the grate 1526 is in the lowered position 1534. The first pivot member 1694 may include an abutting edge 1806 on an opposing side relative to the rounded end 1804. The abutting edge 1806 may rest upon the second outwardly angled side 1800 when the grate 1526 is in the lowered position 1534.

Referring to FIGS. 27 and 28, as the grate 1526 rotates between the lowered position 1534 and the raised position 1530, the rounded end 1804 of the first pivot member 1694 may slidably engage the first outwardly angled side 1798 within the cavity 1794. The rounded end 1804 may slidably engage the first outwardly angled side 1798 and the rounded portion 1802 until a top surface 1808 of the first pivot member 1694 rests against the first outwardly angled side 1798. In this way, the first outwardly angled side 1798 may be configured as the abutting surface 1662 within the cavity 1794. The cavity 1794 may retain the grate 1526 in the raised position 1530 to prevent the grate 1526 from rotating beyond the raised position 1530. The first outwardly angled side 1798 and the rounded portion 1802 may be configured to substantially mirror the size and/or shape of the first pivot member 1694 to provide a close fit with the first pivot member 1694. To rotate the grate 1526 back to the lowered position 1534, the rounded end 1804 may slidably engage the rounded portion 1802 and the first outwardly angled side 1798 until the abutting edge 1806 rests upon the second outwardly angled side 1800. The second pivot member 1696 may be similarly configured.

Figure 29:
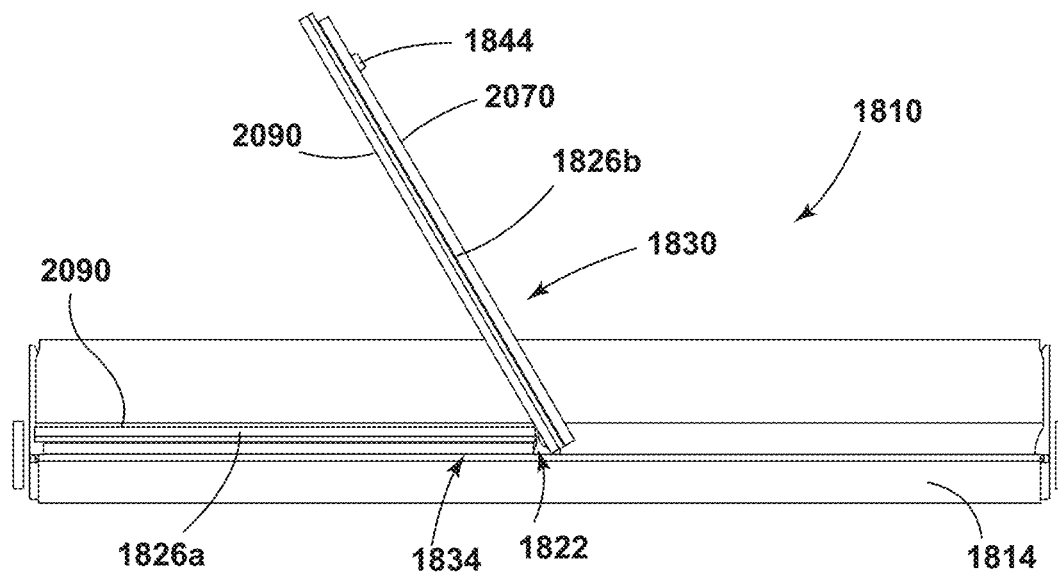
FIG. 29 is a front plan view of a cooktop where a first grate is in a lowered position and a second grate is in a raised position, according to the present disclosure.

Referring now to FIG. 29, an additional or alternative configuration of a cooktop 1814 is illustrated. The cooktop 1814 may include first and second grates 1826a, 1826b configured to be independently operable between raised and lowered positions 1830, 1834. The coupling member 22 may be centrally located on the cooktop 1814. Each of the first and second grates 1826a, 1826b may engage a coupling member 1822 to rotate between the raised and lowered positions 1830, 1834. The grates 1826a, 1826b may be rotated to the raised position 1830 by the user moving the first and second grates 1826a, 1826b upward and out relative to the cooktop 1814. In this way, when the first grate 1826a is in the raised position 1830, the first grate 1826a may rest upon a first end 1992 of the second grate 1826b, which may be in the lowered position 1834. Similarly, when the second grate 1826b is in the raised position 1830, the second grate 1826b may rest upon the first end 1992 of the first grate 1826a. Stated differently, one of the grates 1826a, 1826b may be rotated and the other end of the first and second grates 1826a, 1826b may operate as a retaining feature to retain one of the first and second grates 1826a, 1826b in the raised position 1830 and prevent disengagement from the cooktop 1814.

Figure 30:
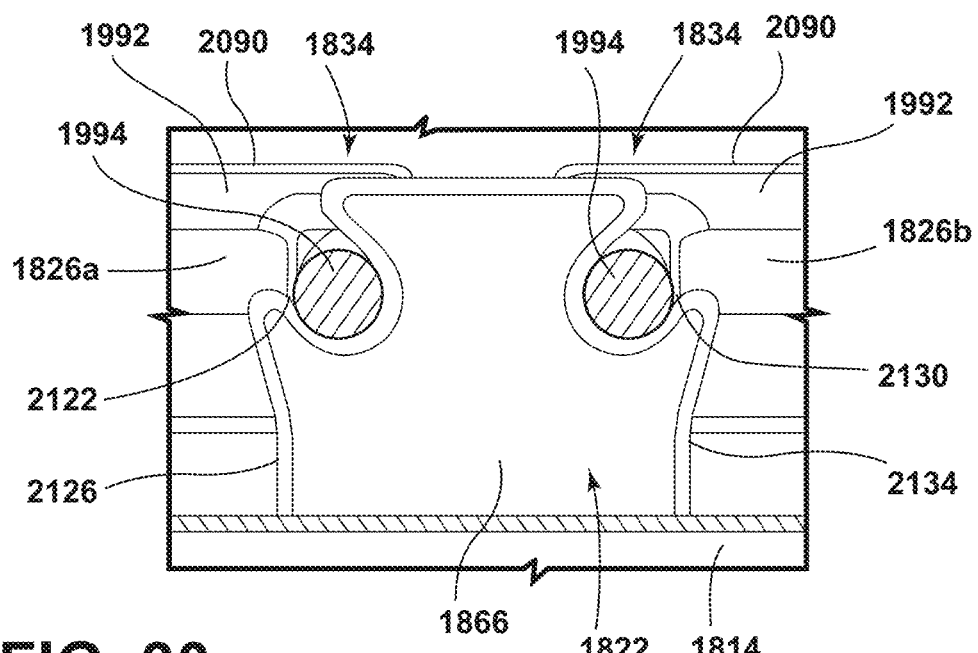
FIG. 30 is a front view of pivot members of first and second grates associated with a coupling member for a cooktop, according to the present disclosure.

Referring to FIGS. 29 and 30, the coupling member 1822 may include a body 1866 defining a first cavity 2122 on a first side 2126 and a second cavity 2130 and a second side 2134. The first grate 1826a may include a first pivot member 1994 rotatably engaging the first cavity 2122 and the second grate 1826b may include the first pivot member 1994 rotatably engage with the second cavity 2130. In this way, the coupling member 1822 may support the first and second grates 1826a, 1826b and an additional coupling member 1822 may engage the second pivot members 1996 of the first and second grates 1826a, 1826b within first and second cavities 2122, 2130. Each of the first and second cavities 2122, 2130 may include an abutting surface 1962. As illustrated in FIG. 30, the first pivot member 1994 is configured as a pin extending outward from proximate the first end 1992 of each of the first and second grates 1826a, 1826b. The second pivot members 1996 may be similarly configured. The first pivot member 1994 may be received within the U-shaped first and second cavities 2122, 2130. The first pivot members 1994 may rotate within the first and second cavities 2122, 2130 as the grates 1826a, 1826b rotate between the raised and lowered positions 1830, 1834. The first pivot members 1994 and/or the first ends 1992 of the first and second grates 1826*a*, 1826*b* may engage the abutting surfaces 1962, when the first and second grates 1826*a*, 1826*b* are in the raised position 1830.

For each of the constructions and configurations shown in FIGS. 1-30, it will be understood that the various configurations can be applied depending on the application of the cooktop 14. In various examples, the grate 26 and the griddle 378 may be interchangeably coupled to the coupling members 22 disposed on the cooktop 14. In this way, the user may arrange the cooktop 14 based on specific preferences, applications, etc. Each of the grates 26 and the griddles 378 disclosed herein may be used on the same cooktop 14, such that the user may interchange the grates 26 and the griddles 378. Moreover, more than one configuration of the coupling member 22 may be included on the cooktop 14 to increase the interchangeability of the cooktop 14 arrangement. It is also contemplated that any of the grates 26 and the griddles 378 disclosed herein may include any configuration of the first and second pivot members 194, 196 and may be associated with any configuration of the coupling member 22. Further, it is contemplated that the configurations of the grates 26 and the griddles 378 may be interchanged. For example, any reference to the grate 26 may also be applied to the griddle 378, and any reference to the griddle 378 may also be applied to the grate 26.

Use of the presently disclosed device may provide a variety of advantages. For example, the various configurations of the grate 26 and the griddle 378 may provide for various arrangements of the cooktop 14. Moreover, the user may arrange the cooktop 14 in a variety of arrangements as the grate 26 and/or the griddle 378 are selectively and/or interchangeably associated with the coupling member 22. Further, the cooktop 14 may include more than one configuration of the coupling member 22. In this way, the user may have increased options for the configuration of the cooktop 14. Additionally, the grate 26, the grate 26 with the griddle portion 58, and/or the griddle 78 may provide increased applications of the cooktop 14 for the user. Additional benefits or advantages of using this device may also be realized and/or achieved.

According to an aspect of the present disclosure, a cooking appliance includes a cooktop and a burner mounted on the cooktop. At least one coupling member is coupled to the cooktop. A grate is selectively coupled to the at least one coupling member and is operable between a raised position and a lower position when the grate is engaged with the at least one coupling member.

According to another aspect, a cooktop includes a griddle. At least one coupling member includes a first coupling member selectively engaging a grate and a second coupling member selectively engage with the griddle.

According to yet another aspect, each of first and second coupling members includes a first pin and a second pin. A griddle includes a first pivot member and a second pivot member rotatably engaging the first and second pins. A grate includes a first pivot member and a second member rotatably engaging the first and second pins.

According to still another aspect, a grate includes a centrally-disposed griddle portion.

According to another aspect, a griddle includes first upper and lower pivot members on a first end and second upper and lower pivot members on the first and spaced-apart from the first upper and lower pivot members.

According to yet another aspect, first upper and lower pivot members and second upper and lower pivot members are configured to selectively engage at least one coupling member and a first side use position and a second side use position, respectively.

According to another aspect, a first surface of a griddle corresponds to a griddle surface that is exposed when the griddle is in a first side use position. A second surface of the griddle corresponds to a grill surface that is exposed when the griddle is in a second side use position.

According to yet another aspect, a griddle includes at least one first retaining protrusion that extends from a first edge of a first end of the griddle. At least one second edge-retaining protrusion extends from a second edge of the first end.

According to another aspect, at least one first retaining protrusion engages at least one coupling member to prevent disengagement of a griddle when the griddle is in a first side use position. At least one second edge-retaining protrusion engages the at least one coupling member to prevent disengagement of the griddle when the griddle is in a second side use position.

According to an aspect of the present disclosure, a cooktop assembly includes a cooktop and a burner mounted on the cooktop. A coupling member is coupled to the cooktop and includes a body that has a first pin that extends from a first end of the body in a first direction and a second pin that extends from a second end of the body in the first direction. A grate includes a pivot member that selectively engages the coupling member. The grate is operable between a raised position and a lower position when the pivot member are engaged with the coupling member.

According to another aspect, a pivot member configured as a projection defines a receiving cavity and is slidably engageable with at least one of first and second pins along a second direction opposite a first direction.

According to still another aspect, a coupling member defines a first locking cutout proximate a first pin and a second locking cutout proximate a second pin. An upper surface of the grate engages an abutting surface of each of the first and second locking cutouts to retain the grate in a raised position.

According to another aspect, a body of a coupling member defines a cutout that has an abutting surface. A grate includes a retaining protrusion that engages the abutting surface when the grate is in a raised position.

According to yet another aspect, a cooktop assembly includes a griddle that includes a pivot member. The pivot member is a C-shaped receiver that selectively engages at least one of first and second pins of a coupling member.

According to another aspect, a griddle is operable between a raised position and the lowered position. The griddle includes a retaining protrusion that engages a coupling member when the griddle is in the raised position.

According to an aspect of the present disclosure, a cooktop assembly includes a cooktop and a coupling member coupled to the cooktop. The coupling member defines at least one cavity that has an abutting surface. At least one grate is rotatable between a raised position and a lowered position. The at least one grate includes a pivot member engageable with the coupling member and that extends from a first end of the at least one grate. The first end engages the abutting surface when the grate is in the raised position.

According to yet another aspect, at least one grate includes a first grate and a second grate. At least one cavity includes a first cavity on a first side of the coupling member rotatably engaging a pivot member of the first grate and a second cavity on a second side of the coupling member rotatably engaging a pivot member of the second grate.

According to still another aspect, a coupling member is centrally located on a cooktop.

According to another aspect, a coupling member has a first outwardly angled side and a second opposing outwardly angled side defining at least one cavity. A pivot member slidably engages the first outwardly angled side when rotating between a raised position and a lowered position.

According to yet another aspect, a pivot member includes an abutting edge that engages a second opposing outwardly angled side when at least one grate is in a lowered position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
   a cooktop;
   a burner mounted on the cooktop;
   a coupling member coupled to a top surface of the cooktop, the coupling member having;
      a body defining a cutout with an abutting surface on an inner side of the coupling member; and
      first and second pins extending in opposing directions from opposing sides of the body, wherein the cutout is defined between the first and second pins; and
   a griddle selectively coupled to the coupling member and operable between a raised position and a lowered position when the griddle is engaged with the coupling member, the griddle including:
      first and second receiving members extending from a coupling edge of the griddle to engage the first and second pins; and
      an elongated retaining protrusion that extends along the coupling edge between the first and second receiving members, wherein the elongated retaining protrusion is configured to rotate in a space defined by the cutout to abut the abutting surface within the cutout of the coupling member to retain the griddle in the raised position, the abutting surface being oriented toward the cooktop.

2. The cooking appliance of claim 1, further comprising:
   a second coupling member having first and second pins; and
   a grate selectively engaging the first and second pins of the second coupling member.

3. The cooking appliance of claim 2, wherein the grate includes a centrally-disposed griddle portion.

4. The cooking appliance of claim 3, wherein the grate includes support members disposed on at least one side of the centrally-disposed griddle portion.

5. The cooking appliance of claim 2, wherein the first and second pins of the second coupling member extend in a same direction to slidably receive pivot members of the grate.

6. The cooking appliance of claim 1, wherein the elongated retaining protrusion, the first receiving member, and the second receiving member are disposed along the coupling edge of a first end of the griddle with the elongated retaining protrusion centrally located between the first and second receiving members.

7. The cooking appliance of claim 1, wherein the griddle further comprises:
   a raised border portion extending at least partially around a cooking surface.

8. A cooktop assembly, comprising:
   a cooktop;
   a coupling member coupled to an edge of the cooktop, the coupling member having a cutout with an abutting surface defined between a first pin and a second pin, the abutting surface being oriented toward the cooktop; and
   a griddle including:
      a rear wall extending between first and second cooking surfaces;
      a first pivot protrusion extending from the rear wall and defining first and second pivot members aligned with one another;
      a second pivot protrusion extending from the rear wall and defining third and fourth pivot members, the third and fourth pivot members aligned with one another and with the first and second pivot members, wherein the first and third pivot members are engaged with the first and second pins when the griddle is in a first side use state and the second and fourth pivot members are engaged with the first and second pins when the griddle is in a second side use state;

a first edge retaining protrusion extending from the rear wall proximate to the first cooking surface and between the first and third pivot members, the first retaining protrusion configured to engage the abutting surface to retain the griddle in a raised position when the griddle is in the first side use state; and at least one second edge retaining protrusion extending from the rear wall proximate to the second cooking surface and between the second and fourth pivot members, the at least one second edge retaining protrusion configured to engage the abutting surface to retain the griddle in the raised position when the griddle is in the second side use state.

9. The cooktop assembly of claim 8, wherein the griddle includes laterally extending tabs that extend from side edges of the griddle and are configured to abut at least one of an adjacent griddle and an adjacent grate.

10. The cooktop assembly of claim 8, wherein the first and second pivot members are disposed on a first side of the rear wall of the griddle and the third and fourth pivot members are disposed on a -second side of the rear wall of the griddle.

11. The cooktop assembly of claim 8, wherein the
at least one second edge retaining protrusion includes two second edge retaining protrusions disposed on the rear wall of the griddle.

12. The cooktop assembly of claim 11, wherein the first edge retaining protrusion is centrally located between the two second edge retaining protrusions.

13. The cooktop of claim 8, wherein the first cooking surface of the griddle is a planar griddle surface exposed when the griddle is in the first side use position and the second cooking surface of the griddle is a grill surface exposed when the griddle is in the second side use position.

* * * * *